DIGITAL CODING AND TRANSLATING SYSTEM

Original Filed March 9, 1954

CARL P. SPAULDING,
INVENTOR.

BY

Barkelew & Scaulebury
ATTORNEYS

DIGITAL CODING AND TRANSLATING SYSTEM

Original Filed March 9, 1954

INVENTOR.
CARL P. SPAULDING,
BY
Bartelsen & Scantlebury
ATTORNEYS.

DIGITAL CODING AND TRANSLATING SYSTEM

Original Filed March 9, 1954

CARL P. SPAULDING,
INVENTOR.

BY
Berkelew + Scantlebury
ATTORNEYS.

CARL P. SPAULDING,
INVENTOR.

BY Barkalow & Scantlebury
ATTORNEYS.

DIGITAL CODING AND TRANSLATING SYSTEM

Original Filed March 9, 1954

CARL P. SPAULDING,
INVENTOR.

BY Barbeler + Scantlebury
ATTORNEYS.

CARL P. SPAULDING,
INVENTOR.

BY Berkeley & Scantlebury
ATTORNEYS.

CARL P. SPAULDING,
INVENTOR.

BY
Barkelew + Scantlebury
ATTORNEYS.

DIGITAL CODING AND TRANSLATING SYSTEM

Original Filed March 9, 1954

CARL P. SPAULDING,
INVENTOR.

BY Barkelew & Scantlebury
ATTORNEYS.

DIGITAL CODING AND TRANSLATING SYSTEM

Original Filed March 9, 1954

INVENTOR.
CARL P. SPAULDING,
BY
Barkelew & Scantlebury
ATTORNEYS.

DIGITAL CODING AND TRANSLATING SYSTEM

Original Filed March 9, 1954 Sheet 10 of 10

CARL P. SPAULDING,
INVENTOR.

BY Barkelew & Scantlebury
ATTORNEYS.

United States Patent Office

Re. 26,607
Reissued June 17, 1969

26,607

DIGITAL CODING AND TRANSLATING SYSTEM

Carl P. Spaulding, San Marino, Calif., assignor, by mesne assignments, to Giannini Controls Corporation, Duarte, Calif., a corporation of New York Original No. 3,165,731, dated Jan. 12, 1965, Ser. No. 415,058, Mar. 9, 1954. Application for reissue Feb. 21, 1968, Ser. No. 709,151

Int. Cl. H04l *3/00;* G06f *5/00*

U.S. Cl. 340—347 43 Claims

Matter enclosed in heavy brackets [ ] appears in the original patent but forms no part of this reissue specification; matter printed in italics indicates the additions made by reissue.

This invention has to do broadly with the transformation of data between analogue and digital forms.

An important object of the present invention is to provide apparatus capable of receiving data in analogue form and of producing a corresponding output in digital form.

As the input analogue variable passes continuously from one digital value to the next, the output must shift from one digital representation to the next, without the possibility, even momentarily, of giving a spurious result.

One potential source of such a spurious output arises when the digital output is expressed in a digital code, such, for example, as the common or Arabic decimal code, in which the symbols representing two or more digits may change simultaneously between adjacent expressions.

In accordance with the present invention, such difficulties are avoided by the use of digital codes of such type that only one symbol changes at a time. Codes of that type are denoted generically as "syncopic" codes. Such codes are sometimes referred to as "cyclic" or "monostrophic" codes. More precisely, digital number codes are syncopic if the code configurations that represent two successive numbers differ only in the state of one digit.

An important object of the invention is to provide convenient means for transforming data from analogue form into the form of a syncopic digital code. A further object of the invention is to provide means for transforming data expressed in terms of a syncopic digital code into the form of a common digital code, such, for example, as ordinary Arabic decimal notation, in a form well adapted for practical utilization.

The invention is further concerned with the provision of syncopic digital codes that are particularly useful for the described purposes.

It is advantageous that such syncopic codes be as similar as possible to the Arabic decimal code, and that the rules for conversion of information between the syncopic code and the common code be simple and convenient in application so that such conversion may be made mentally without undue difficulty. The syncopic code is preferably of such a nature that the mechanism required for automatically translating it to the common digital code may be as simple and economical as possible.

The invention is particularly effective and useful with relation to a common digital output in the form of ordinary Arabic decimal notation; and it will be described primarily with relation to systems and codes particularly adapted for such use, but without implying any necessary limitation of the scope of the invention to that particular type of common digital code.

One aspect of the invention is concerned with the representation of Arabic decimal numbers by a syncopic decimal code. Particularly useful illustrative types of syncopic decimal code are provided in which each digit may assume 10 distinct values in one instance, and 18 distinct values in another. Each such value is denoted by a distinct code symbol. The very nature of a syncopic code requires, however, that the correspondence between the syncopic symbols (whatever their number) and the Arabic figures that they represent cannot be entirely unique. An important feature of the invention is the discovery of particularly convenient and effective types of correspondence that may be used and that lead to economical instrumentation.

In accordance with the invention, translation of each Arabic decimal digit into the corresponding syncopic decimal digit requires, at least in certain instances, reference to the decimal digit of next higher significance. A particular object of the invention is to facilitate that reference by limitation of the scope of the information that must be so obtained. That required information preferably consists of an answer to the single question whether the decimal digit of next higher significance is even or odd. In the preferred codes of the invention, two distinct types of correspondence are employed for relating the syncopic decimal symbols and the Arabic decimal figures which they represent. One of those types of correspondence is used when the Arabic decimal digit of next higher significance is even, and the other type of correspondence is used when that Arabic digit is odd. The quality of a number that determines whether it is even or odd is referred to as its parity. Therefore translation in either direction between an Arabic number and its representation in such a syncopic decimal code requires, with respect to each decimal digit, reference to the Arabic digit of next higher significance to determine its parity, and then translation of the digit itself in accordance with the type of correspondencs required by that parity.

For convenience of description, and with reference to any digit, the parity of the digit of next higher significance (which, in conventional notation is always the preceding digit) will be referred to as the "preceding parity" of the digit in question. It is emphasized that, in the presently preferred types of code, translation in either direction between Arabic and syncopic decimal code requires reference to the parity of the preceding digit as it appears in Arabic, not in syncopic, notation. That is to be understood whenever the preceding parity of a digit is mentioned, but may be further emphasized by the more complete expression "preceding Arabic parity."

A further aspect of the invention is concerned with the mechanization of syncopic codes by means of a system which comprises a suitable number of physical code elements, each capable of more than one stable state. Each Arabic decimal number within the range of the system corresponds to, and is uniquely represented by, a particular set of states of the code elements of the entire system. That correspondence defines, by reference to the sequence of decimal numbers, a definite order of the corresponding sets of states of the code elements. Those sets of code element states have the important property, since the code is syncopic, that any two consecutive sets of states differ from each other only in the state of a single code element. That code element will be designated for convenience of description as the "critical code element" for that particular pair of consecutive sets of states. The two consecutive Arabic decimal numbers to which those two sets of states correspond may differ only in the value of the digit of least significance, which is then the critical digit for the two Arabic numbers; or may differ in the values of two or more digits, all of which will then be designated as "critical digits" for that pair of consecutive numbers.

It is convenient to mechanize the code by physical elements having only two alternative states. Physical elements of that type are particularly reliable and economical. Moreover, many large-scale digital computers work in a binary coded decimal system. Accordingly, it is preferred to represent each digit of the syncopic decimal code by four or more binary digits, the values of which are directly indicated by the respective states of corresponding physical code elements of binary type. The resulting representation may be characterized as a syncopic binary coded decimal representation of the Arabic numbers.

Many varieties of physical elements of binary type are available, including, for example, electrical contacts that may be open or closed, gas tubes that may be conducting or non-conducting, relays that may be energized or non-energized, and magnetic cores that may be magnetized or unmagnetized. The invention may utilize physical code elements of many types, including those enumerated, the physical state of each code element indicating the value of the corresponding binary digit. The two alternative values of each bindary digit, and also the two alternative stable states of the corresponding physical code element, will be indicated arbitrarily by the symbols x and o. When one state of the code element involves the flow of electric current or the closure of a circuit, and the other does not, the former state will ordinarily be indicated by x and the latter by o, but without implying any limitation upon the scope of the invention.

A further important aspect of the invention is the provision of particularly convenient and effective means for generating such a binary coded decimal representation of the Arabic numbers that correspond, for example, to definite successive ranges of position of a movable physical element. The movement of such an element may be of many types, including, for example, rotary and translational, and may be produced in any known manner, ordinarily in direct correspondence to the variation of some physical quantity to be indicated. The resulting binary code representation of the position of the physical element may then, for example, be recorded directly on punched tape for later use as may be required.

And the invention further concerns means for automatically translating a syncopic code representation of the binary type described into the common Arabic number code. Such translating means includes means for determining the preceding Arabic parity for each syncopic decimal digit, and for utilizing the resulting information to produce correct translation of the binary code elements representing that digit.

Binary codes that are syncopic but fail to provide any direct representation of decimal digits have been described, for example in United States Patent 2,405,617, issued on August 13, 1946, to F. J. Singer et al. Such codes are entirely distinct from those of the present invention, in which the syncopic property is combined with a direct correspondence between groups of binary code elements and respective Arabic digits. Patent 2,405,603, issued on August 13, 1946, to R. D. Parker et al., discloses a system that has some elements in common with the present invention, but that provides only rudimentary translating means that cannot present the Arabic number in digital form, and hence are impractical for numbers having more than two Arabic digits.

A full understanding of the invention and of its further objects and advantages will be had from the following description of certain illustrative embodiments, of which description the accompanying drawings are a part. Many changes can be made in the particular arrangements and structures of those embodiments without departing from the scope of the invention, which is defined by the appended claims.

In the drawings:

FIG. 1 is a schematic perspective representing an illustrative linear generating means for a syncopic code of one illustrative type;

FIG. 2 corresponds to a portion of FIG. 1 at enlarged scale;

FIG. 6 is a schematic block diagram illustrating an aspect of the circuitry of FIG. 5;

Figure 1:
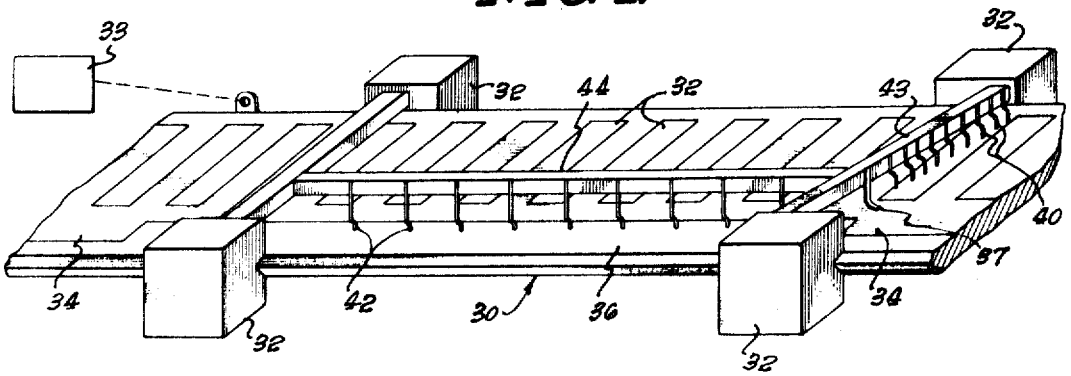

In an illustrative preferred type of syncopic decimal code in accordance with the invention, each digit may assume just ten distinct values, each of which represents one Arabic figure when the preceding Arabic parity is even, and represents another such figure when that parity is odd, the sum of those two figures being, in every instance, equal to nine. When the sum of two numbers is nine, each is said to be the 9's complement of the other. Thus, each symbol of the present type of syncopic decimal code represents a definite Arabic figure when the preceding Arabic parity is even, and represents the 9's complement of that Arabic figure when the preceding Arabic parity is odd.

In writing such a syncopic code it is convenient to represent the ten syncopic digit values by symbols that are identical with the respective ten Arabic figures 0 through 9 that they represent in accordance with a selected one of the two defined types of correspondence. The type of correspondence employed illustratively will be that which obtains when the preceding parity is even. In that illustrative notation, the present type of syncopic decimal code appears as shown in Table 1, and will be referred to as Code I. In that table certain selected Arabic numbers are entered in column 1, with the corresponding Code I representations in column 2. The code representations corresponding to other Arabic numbers will be evident from those given explicity in the table.

TABLE 1
Code I

| Arabic Number | Syncopic Decimal Code | Syncopic Binary Code | | |
|---|---|---|---|---|
| | | 100's digit ABCD | 10's digit ABCD | 1's digit ABCD |
| 0 | 0 | xooo | xooo | xooo |
| 1 | 1 | | | xxoo |
| 2 | 2 | | | oxoo |
| 3 | 3 | | | oxxo |
| 4 | 4 | | | ooxo |
| 5 | 5 | | | ooxx |
| 6 | 6 | | | oxxx |
| 7 | 7 | | | oxox |
| 8 | 8 | | | xxox |
| 9 | 9 | | xooo | xoox |
| 10 | 19 | | xxoo | xoox |
| 11 | 18 | | | xxox |
| 12 | 17 | | | oxox |
| 13 | 16 | | | oxxx |
| 14 | 15 | | | ooxx |
| 15 | 14 | | | ooxo |
| 16 | 13 | | | oxxo |
| 17 | 12 | | | oxoo |
| 18 | 11 | | | xxoo |
| 19 | 10 | | xxoo | xooo |
| 20 | 20 | | oxoo | xooo |
| 21 | 21 | | oxoo | xxoo |
| 28 | 28 | | oxoo | xxox |
| 29 | 29 | | oxoo | xoox |
| 30 | 39 | | oxxo | xoox |
| 31 | 38 | | oxxo | xxox |
| 98 | 91 | xooo | xoox | xxoo |
| 99 | 90 | xooo | xoox | xooo |
| 100 | 190 | xxoo | xoox | xooo |
| 101 | 191 | xxoo | xoox | xxoo |
| 109 | 199 | xxoo | xoox | xooo |
| 110 | 189 | xxoo | xxoo | xooo |
| 111 | 188 | xxoo | xxoo | xxoo |
| 325 | 375 | oxxo | oxox | ooxx |
| 433 | 436 | ooxo | oxxo | oxxx |
| 499 | 490 | ooxo | xoox | xooo |
| 500 | 590 | ooxx | xoox | xooo |

A generalized rule for converting any Arabic decimal number to the corresponding representation in Code I is as follows: starting with the most significant Arabic digit and progressing to the right, each Arabic digit that is preceded by an even digit is copied directly; each Arabic digit that is preceded by an odd digit is replaced by its 9's complement. (The Arabic digit of greatest significance is considered to be preceded by a zero, and is therefore always copied directly.) To convert from the syncopic representation to the corresponding Arabic number: proceeding again from left to right, copy the syncopic code symbol directly whenever the preceding Arabic digit was even; write down the 9's complement of the syncopic code symbol whenever the preceding Arabic digit was odd.

Another illustrative syncopic decimal code in accordance with the invention is shown in the second column of Table 2, and will be referred to as Code II. The representation of the Arabic figures 0 to 9 in Code II is identical with that in Code I, already described. Moreover, when the preceding Arabic digit has one parity, illustratively taken as even, the Arabic figures 1 through 8 are also repreesnted in Code II in the same way as in Code I, namely, by the same symbols as in Arabic notation. However, when the preceding Arabic digit has the other parity, illustratively taken as odd, Code II utilizes an additional eight distinct symbols to represent the respective Arabic figures 1 through 8. Those eight symbols are indicated arbitrarily as a, b, c, d, e, f, g, and h, respectively. Accordingly, Code II utilizes in all 18 distinct symbols.

TABLE 2
Code II

| Arabic Number | Syncopic Decimal Code | Syncopic Binary Code | | |
|---|---|---|---|---|
| | | 100's digit ABCDEFGHI | 10's digit ABCDEFGHI | 1's digit ABCDEFGHI |
| 0 | 0 | ooooooooo | ooooooooo | ooooooooo |
| 1 | 1 | | | xoooooooo |
| 2 | 2 | | | xxoooooooo |
| 3 | 3 | | | xxxoooooooo |
| 4 | 4 | | | xxxxoooooo |
| 5 | 5 | | | xxxxxoooooo |
| 6 | 6 | | | xxxxxxoooo |
| 7 | 7 | | | xxxxxxxoo |
| 8 | 8 | | | xxxxxxxxo |
| 9 | 9 | | ooooooooo | xxxxxxxxx |
| 10 | 19 | | xoooooooo | xxxxxxxxx |
| 11 | 1a | | | oxxxxxxxx |
| 12 | 1b | | | ooxxxxxxx |
| 13 | 1c | | | oooxxxxxx |
| 14 | 1d | | | ooooxxxxx |
| 15 | 1e | | | oooooxxxx |
| 16 | 1f | | | ooooooxxx |
| 17 | 1g | | | oooooooxx |
| 18 | 1h | | | ooooooooxx |
| 19 | 10 | | xoooooooo | ooooooooo |
| 20 | 20 | | xxoooooooo | ooooooooo |
| 21 | 21 | | xxoooooooo | xoooooooo |
| 28 | 28 | | xxoooooooo | xxxxxxxxo |
| 29 | 29 | | xxoooooooo | xxxxxxxxx |
| 30 | 39 | | xxxoooooooo | xxxxxxxxx |
| 31 | 3a | | xxxoooooooo | oxxxxxxxx |
| 98 | 9h | ooooooooo | xxxxxxxxx | oooooooox |
| 99 | 90 | ooooooooo | xxxxxxxxx | ooooooooo |
| 100 | 190 | xoooooooo | xxxxxxxxx | ooooooooo |
| 101 | 19a | xoooooooo | xxxxxxxxx | xoooooooo |
| 109 | 199 | | xxxxxxxxx | xxxxxxxxx |
| 110 | 1a9 | | oxxxxxxxx | xxxxxxxxx |
| 111 | 1aa | | oxxxxxxxx | oxxxxxxxx |
| 325 | 3b5 | xxxoooooo | ooxxxxxxx | xxxxxoooo |
| 433 | 43c | xxxxoooooo | xxxoooooo | oooxxxxxx |
| 499 | 490 | xxxxoooooo | xxxxxxxxx | ooooooooo |
| 500 | 590 | xxxxxoooo | xxxxxxxxx | ooooooooo |

It may be noted that Codes I and II both satisfy the fundamental condition that the ten alternative values of each Arabic digit are represented by one set of symbols for even preceding parity and by another set of symbols for odd preceding parity. In Code I those two sets of symbols differ only in order, while in Code II they differ both in order and in the symbols employed.

Furthermore, Code I satisfies the further condition that the code symbol representing the Arabic digit value 9 in each set is the same as the symbol representing 0 in the other set. In Code I that second condition follows from the more stringent characteristic, already discussed, that each code symbol represents one Arabic figure for even preceding parity and represents the 9's complement of that figure for odd preceding parity. Codes having that preferred characteristic constitute a sub-class of all codes satisfying the two conditions just defined.

The representation of a decimal digit in binary form requires the use of at least four binary digits. For example, three binary digits can provide only eight distinct combinations of values. On the other hand, four binary digits, or code elements, can provide 16 distinct combinations of values, and there is a tremendous number of different ways in which ten distinct combinations can be formed. However, for the purposes of the present invention the further requirement is made that the binary representation of the syncopic decimal code be itself syncopic. That is to say, only one of the four (or more) binary code elements may change state in passing between the sets of states that represent any two consecutive values of the syncopic decimal digit. That requirement is both necessary and sufficient to insure that the entire set of binary code elements, considered directly as a representation of a sequence of Arabic numbers, shall constitute a syncopic representation of those numbers.

The requirement that the binary code be syncopic can be satisfied with a binary code in which each set of code element states corresponds uniquely to a definite symbol of the syncopic decimal code. Two types of correspondence, such as are required for representing the non-syncopic Arabic numbers in a syncopic decimal code, are not requried for representation of the syncopic decimal code in syncopic binary form. However, if the binary code is considered directly as a representation of the Arabic decimal numbers, then two types of correspondence are involved, one of which obtains when the preceding Arabic parity is even, and the other when it is odd.

To facilitate mechanization of the system, as will be described, a further important requirement is preferably made in the binary code. That requirement concerns the relation between the two sets of states of the binary code-elements that represent any one Arabic figure in accordance with the two types of correspondence, already described. It is preferred in accordance with the invention that those two sets of binary code element states be transformable into each other in a simple and uniform manner. Two specific illustrative relationships that provide such transformability will be described in detail. In one, illustrated typically in connection with Code I, the binary code representation of any Arabic digit value for one preceding parity is transformable into the binary representation of that digit value for the other preceding parity merely by inverting the state of a particular one of the binary code elements. That particular code element will be referred to as the parity code element. Inversion of the state of that one binary code element always transforms the code representation of an Arabic figure for one parity into the representation of the same Arabic figure for the other parity. Due to the described 9's complement relationship of Code I, the same change also transforms the code representation of one Arabic figure (for any one parity) into the representation (for the same parity) of the 9's complement of that figure.

In the other illustrative relationship, which will be illustrated in connection with Code II, transformation between the representations of any Arabic figure for even and odd preceding parity is produced by inverting the states of all the binary code elements corresponding to the decimal digit in question.

In accordance with the invention, the first described relationship may be satisfied in a binary representation of Code I that employs four binary code elements for each syncopic decimal digit by assigning to the parity code element one of its states, say o, for the five syncopic decimal digit values 0 through 4, and its other state, say x, for the remaining five syncopic decimal digit values 5 through 9; and arranging the other three binary code elements in a syncopic code that is symmetrical about the transitions between those two groups of decimal digit values.

There are many distinct syncopic binary codes employing four code elements to represent each syncopic decimal symbol and satisfying the conditions just defined. Any one of those codes can be used effectively in connection with syncopic decimal Code I. It is preferred, however, to avoid codes in which all four code elements may be o (unenergized), since an important type of system failure also leads to that condition and therefore cannot readily be identified as an error. Also, codes in which all four code elements may be x (energized) are preferably avoided, thereby reducing the maximum power requirement of the system by 25%. A binary four-element code that satisfies those preferred conditions in addition to the more fundamental requirements previously described is shown illustratively in the right-hand portion of Table 1. The four binary code elements corresponding to each decimal digit are identified as elements A, B, C and D. Element D is in each instance the parity code element, the properties of which have already been outlined. That binary representation of Code I utilizes just ten distinct combinations of values of each set of four code elements, and those ten combinations correspond uniquely to the respective ten symbols 0 through 9 of syncopic decimal Code I. They do not correspond uniquely to the Arabic decimal digits, but are related to them in the manner already described for the symbols of syncopic decimal Code I.

In the case of Code II, two of the syncopic decimal symbols, namely 9 and 0, represent the Arabic figures indicated by those same symbols when the preceding parity is even, and represent the 9's complements of those figures when the preceding parity is odd. In that respect Code II is identical with Code I. But the remaining Arabic figures 1 through 8 are represented by one series of syncopic decimal symbols when the preceding parity is even and by an entirley different series of symbols when that parity is odd. Each of those symbols of the syncopic code, whenever it occurs, therefore always represents the same Arabic figure. But the symbols of one series (1 through 8) occur only when the preceding parity is even, and the symbols of the other series (a through h) occur only when the preceding parity is odd. Those two series of symbols will be referred to for convenience of description as the even and the odd series, respectively.

When such a code is represented by a binary syncopic code, 18 distinct configurations of code element states are required to represent uniquely the 18 different symbols of the syncopic decimal code. Hence it is necessary to employ at least five binary code elements for each syncopic decimal digit. An illustrative binary code for representation of Code II is shown in columns 3, 4, and 5 of Table 2, and employs nine code elements for each syncopic decimal digit. In that binary Code II the syncopic decimal symbol 0 is always represented by the binary configuration in which all nine binary code elements are in the state o; and the symbol 9 by the configuration in which all nine binary code elements are in state x. As a syncopic decimal digit progresses upward in value from 0 to 9, the binary code elements progressively shift from state o to state x, one code element shifting with each step of the digit value. As the syncopic decimal digit progresses from the value 9 through the values a, b . . . h back to 0, the binary code elements shift progressively back to o state, the order in which the elements shift being the same as before. That feature of progressive shifting in both directions in the same order is an important characteristic of the illustrated binary representation of Code II.

Considering that binary code as a direct representation of the Arabic decimal numbers (rather than of syncopic decimal Code II), each decimal digit value is sometimes represented by one and sometimes by the other of two binary configurations, each of which is the inverse of the other in the sense that it is transformable into the other by inverting the state of all nine code elements.

The illustrated binary representation of Code II has the particular advantage that the value of the Arabic decimal digit (except 9 and 0) represented by any configuration can be read directly from the pattern of code states by simply counting in order the number of code elements in one state that are encountered before reaching the first code element in the other state. For example, in the unit's column of Table 1 opposite the Arabic number 3, the first three code elements are found in condition x; while opposite the Arabic number 13, the first three code elements are found in condition o. That relation greatly facilitates mental translation of the code. Moreover, it may be desirable for some purposes to dispense entirely with any automatic translating mechanism and to indicate the binary code directly, for example by imprinting dots on paper for code elements in one condition, with spaces for elements in the other condition. Code II is well suited for such indication, since the Arabic number represented can be read directly from the pattern of dots.

A particular advantage of binary codes of the type illustrated in Table 2 is that they may be generated by commutator structures of a remarkably simply type. A preferred type of commutator for that purpose requires only one commutator segment for every ten changes of digit value that occur in the entire sequence of Arabic numbers to be represented.

That same simplicity of commutator structure is available for producing a variety of binary codes, in which, for example, the syncopic decimal digit values 0 and 9 are represented respectively by an arbitrary one of the configuration shown in Table 2 and by its inverse. As an example, the two configurations that represent the syncopic decimal values 5 and e in Table 2 may instead represent the syncopic decimal values 0 and 9. Such a code is indicated in fragmentary form in Table 3, only the unit's digit configurations being written out in binary form.

TABLE 3

| Arabic Number | Syncopic Decimal Code | Syncopic Binary Code Unit's Digit |
|---|---|---|
| 1 | 1 | xxxxxxooo |
| 2 | 2 | xxxxxxxoo |
| 3 | 3 | xxxxxxxxo |
| 4 | 4 | xxxxxxxxx |
| 5 | 5 | oxxxxxxxx |
| 6 | 6 | ooxxxxxxx |
| 7 | 7 | oooxxxxxx |
| 8 | 8 | ooooxxxxx |
| 9 | 9 | oooooxxxx |
| 10 | 19 | ooooooxxx |
| 11 | 1a | oooooooxx |
| 12 | 1b | ooooooooxx |
| 13 | 1c | oooooooox |
| 14 | 1d | oooooooooo |
| 15 | 1e | xoooooooo |
| 16 | 1f | xxoooooooo |
| 17 | 1g | xxxoooooo |
| 18 | 1h | xxxxoooooo |
| 19 | 10 | xxxxxoooo |
| 20 | 20 | xxxxxxoooo |
| 21 | 21 | xxxxxxooo |

The binary code indicated in Table 3 involves more than a mere rearrangement of the code elements from Table 2, since the configurations that are repeated in the representations of consecutive Arabic numbers (for example 9 and 10, or 19 and 20) are entirely distinct in the two codes. The code of Table 3 does not, of course, offer the same facility of mental translation that has been described for binary Code II.

Figure 2:
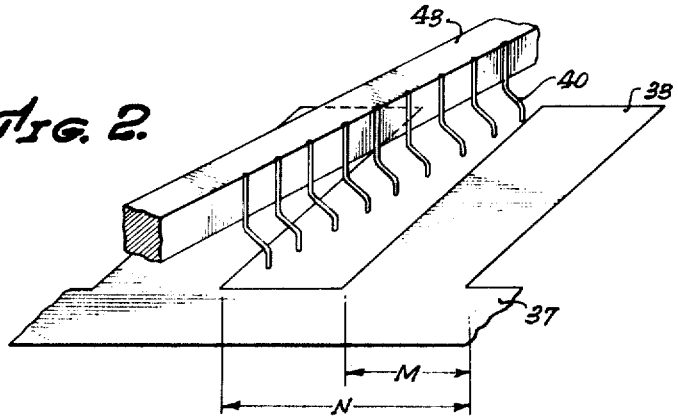
Figure 3:
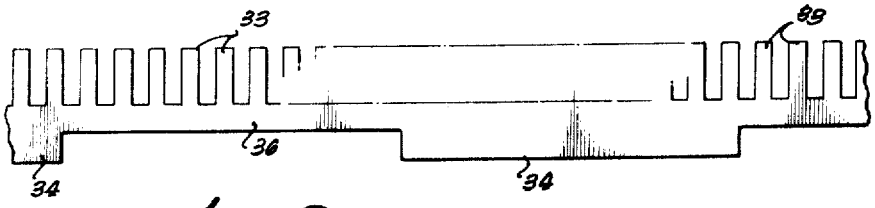
FIG. 3 is a schematic plan of the commutator layout of FIG. 1 at reduced scale.

FIGS. 1, 2 and 3 show schematically a device for producing a binary syncopic code of the type set out in Table 2. That device, which employs a commutator structure interacting with a plurality of brushes, may be considered representative of other equivalent types of structure, such as light diaphragms and photoelectric devices, for opening and closing electric circuits in controlled patterns of action. The commutator of the present embodiment is illustratively shown for translational rather than rotary movement. An elongated table 30 is mounted, as in the ways 32, for longitudinal translational movement, and is driven in that movement by any convenient driving means indicated schematically at 33. Driving means 33 may be considered to move the table in direct proportion to some physical quantity to be measured or recorded, which may typically be the pressure of a gas acting upon the table through expansion of a conventional bellows, a temperature acting upon the table through distortion of a conventional bimetallic temperature responsive element, or the like. The upper flat face of table 30 is of dielectric material and has embedded flush with its surface rectangular commutator segments arranged in longitudinal rows corresponding respectively to the several decimal digits of the Arabic numbers to be represented. As illustrated, segments 33 may be considered to correspond to the decimal unit's digit and segments 34 to the decimal 10's digit. Additional rows of segments may be provided as required, two rows being merely illustrative. As shown, the segments of each row are electrically connected together by the conductive strip 36, and may be connected to ground or to a source of electric power. The single brush 37, which rides on strip 36, provides that connection for all rows of segments, but separate strips and connections for each row may be provided if required.

The commutator segments are engaged by a plurality of electrically independent brushes corresponding respectively to the several code elements of the system. The nine brushes corresponding to each decimal digit are mounted in position to engage the corresponding row of segments. Those nine brushes are arranged in staggered relation so that, as each segment moves under them the brushes are first engaged and then disengaged in ordered sequence and at uniform intervals of the movement of table 30. The nine brushes corresponding to the unit's digit are indicated at 40, and those for the 10's digit at 42, mounted on fixed frame members 43 and 44, respectively. Those frame members may be of dielectric material, or each brush may be mounted in any convenient manner in insulated relation to a metal support structure. Separate wire leads are provided for each brush, and also for brush 37, but are omitted in the figure for clarity of illustration. The brushes 40 are schematically shown at enlarged scale in FIG. 2.

The dimensions of the segments measured transversely of the table are such as to accommodate all nine brushes. When the brushes are arranged in a strictly longitudinal row, as is shown illustratively for brushes 42 corresponding to the 10's digit, that dimension may be relatively small. The longitudinal dimension between centers of adjacent segments, indicated typically at M for segments 33 in FIG. 2, is equal for each row of segments to the length represented by 20 units of the corresponding Arabic digit. For example, in a system intended to indicate movement of table 30 in millimeters, the segments corresponding to the decimal unit's digit would have a dimension M of 20 millimeters, and the 10's decimal digit segments would have a dimension M of 200 millimeters. The actual length of each individual segment in a direction longitudinal of the table, indicated at N in FIG. 2, is just half of M, and is therefore equal to the dielectric space between segments.

For generation of binary Code II the nine brushes corresponding to each decimal digit are uniformly spaced longitudinally of the table at intervals equal to N divided by 10. Then for example, if a segment is considered to be divided transversely of the table into ten equal elements, the nine brushes can be centered respectively in the first nine of those elements, leaving the tenth one empty. Movement of the table one unit of distance, equal to N/10, will then leave the first element empty and will center the nine brushes respectively in the next nine elements. In both of those positions all nine brushes will contact the segment in question, and the movement between those two positions therefore produces no change in the configuration for that decimal digit. The result is a "repeated configuration" such as occurs, for example, in the unit's digit for the two successive Arabic numbers 9 and 10, or 29 and 30 (see Table 2). A repeated configuration of that sort necessarily occurs in the code representation of any digit when a digit of higher significance changes value.

As indicated in FIGS. 1 and 2, when the dimensions M and N are small it is convenient to mount the brushes in a straight row extending obliquely across the commutator surface at such an angle that the conditions just described are satisfied. For generation of the binary code of Table 3, the brushes may be mounted similarly, except that the interval between the fifth and sixth brushes is doubled. If mounted as a diagonal row, there may be an offset between the fifth and sixth brush, or the spacing of those brushes in the direction of the row may simply be made double the normal spacing.

It will be understood that the several rows of segments and their corresponding brushes must be correctly phased, so that, for example, any table position corresponding to make or break a brush contact of any set (except that corresponding to the digit of least significance) is the midpoint of the range of table positions that produce a repeated configuration in the set of next lower significance. Such phasing involves both the relative longitudinal positions of the segments of adjacent rows, and the relative positions of the corresponding sets of brushes. Since the brushes are more readily adjustable, it is preferred to provide, as part of the brush mounting structure, means for longitudinally adjusting each brush independently and also means for simultaneously adjusting all brushes of each sub-system. Since the phasing required for the binary codes of Tables 2 and 3 are believed clear from the tables, it has not been attempted to represent the phasing with strict accuracy, FIG. 1. It will be noted that in spite of the great difference in length of the commutator segments in the several rows, all working edges must be positioned with the same degree of accuracy, which is of the order of the spacing between brushes in the set corresponding to the digit of least significance.

Figure 4:
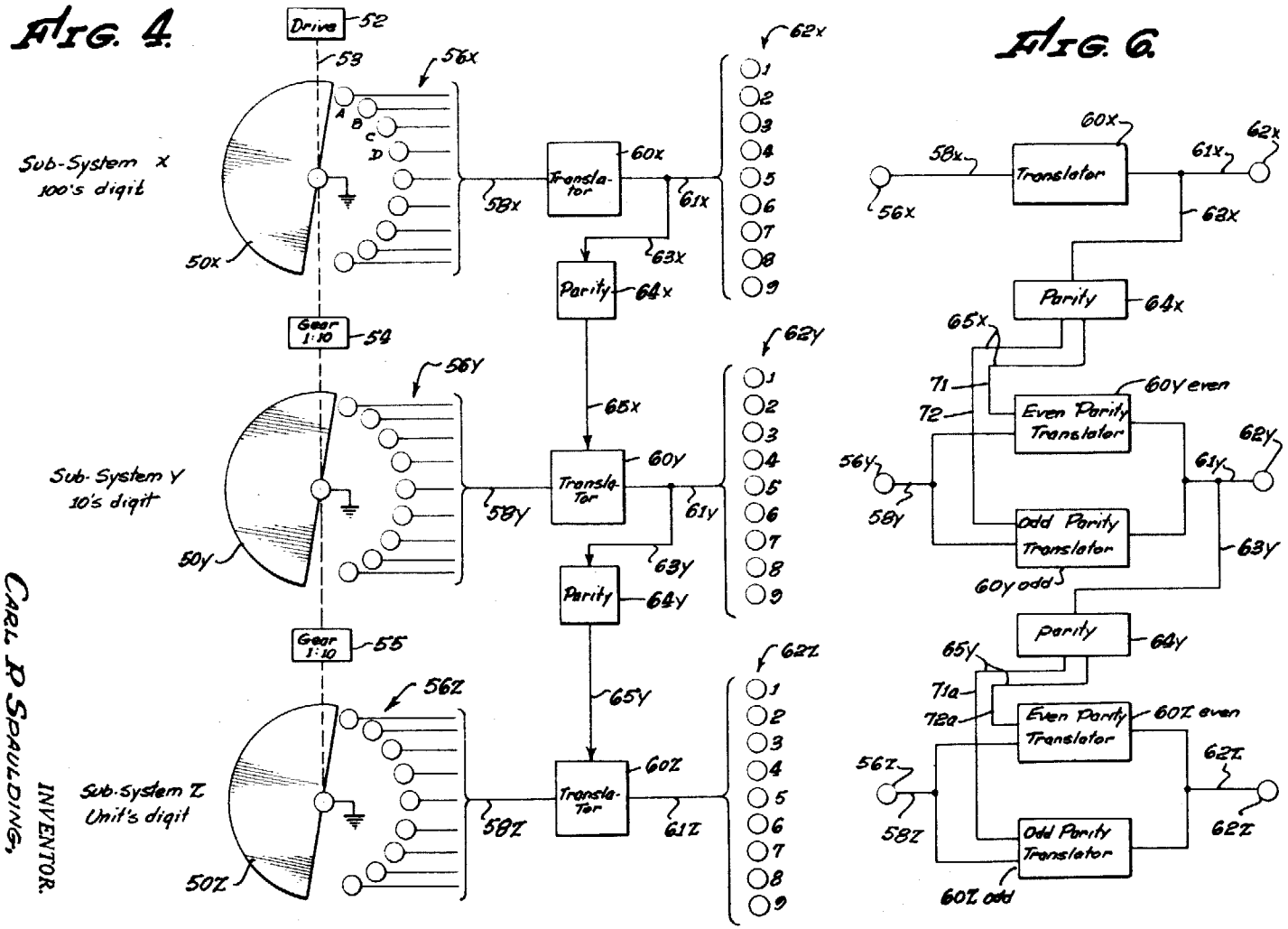
FIG. 4 is a schemtaic block diagram representing another illustrative type of code generating means and a preferred illustrative type of code translating system.

FIG. 4 is a schematic diagram illustrating another type of system for generating binary Code II, and also representing in block form a preferred type of code translating system. Three code elements sets X, Y and Z are shown illustratively, corresponding respectively to the 100's, the 10's and the unit's decimal digits of the Arabic numbers to be represented. Those numbers correspond to, and form a measure of, the rotary output of a driving device, represented schematically at 52. The output shaft of device 52, represented by the dashed line 53, is linked to three rotary commutators 50X, 50Y and 50Z of the indicated sub-systems. Gear boxes, each of which gives a speed increase of 10:1, are inserted in the drive at 54 between 50X and 50Y and at 55 between 50Y and 50Z so that when 50X makes one revolution 50Y makes ten revolutions and 50Z makes one hundred revolutions. Each commutator consists typically of a single 180° conductive segment that engages progressively a set of fixed contacts or brushes 56X, 56Y and 56Z that are spaced at 18° intervals about the commutator axis. (For purposes of description, each contact will be assumed to be of negligible size. However, if all contacts have the same angular extent, its effect can be compensated by reducing the angular extent of commutator 50 by the same angle.) The individual contacts of each set are designated in each instance by the letters A, B, C, D, E, F, G, H and I, respectively, in the order of progressive engagement and disengagement wtih increasing value of the Arabic number that represents the position of shaft 53. As illustrated, all commutators rotate clockwise with increasing value of that number. After engaging the nine contacts progressively at 18° intervals of its rotation, the commutator turns through a further 36° before the contact A is opened. Similarly, after all contacts have been progressively opened (in the same order in which they were closed) the commutator turns through 36° before again closing contact A. The two conditions with all contacts closed and with all contacts open therefore produce repeated configurations. The phasing of the several commutators is such that the mid-point of each 36° interval just mentioned coincides with a make or break position of the commutator of next higher significance.

The output signals from the nine contacts of the several commutators, constituting one form of binary Code II, are supplied to respective translating devices, shown schematically at 60X, 60Y and 60Z, which transform the syncopic code signals into corresponding code signals of a desired type, for example the common Arabic decimal notation. The portion of the entire code generating and translating system that relates to each Arabic decimal digit will be referred to for convenience as a sub-system. The translated outputs of the several sub-systems are delivered, in the particular system illustrated, via lines 61X, 61Y and 61Z to respective sets of nine output terminals 62X, 62Y and 62Z. Those output terminals correspond in a definite manner to the ten Arabic digit values 0 through 9. For example, the Arabic figures 1 to 9 inclusive may be indicated by closure of a electric circuit to the corresponding terminal, and the digit value 0 may be indicated by open circuit to all of the terminals of the set.

Figure 9:
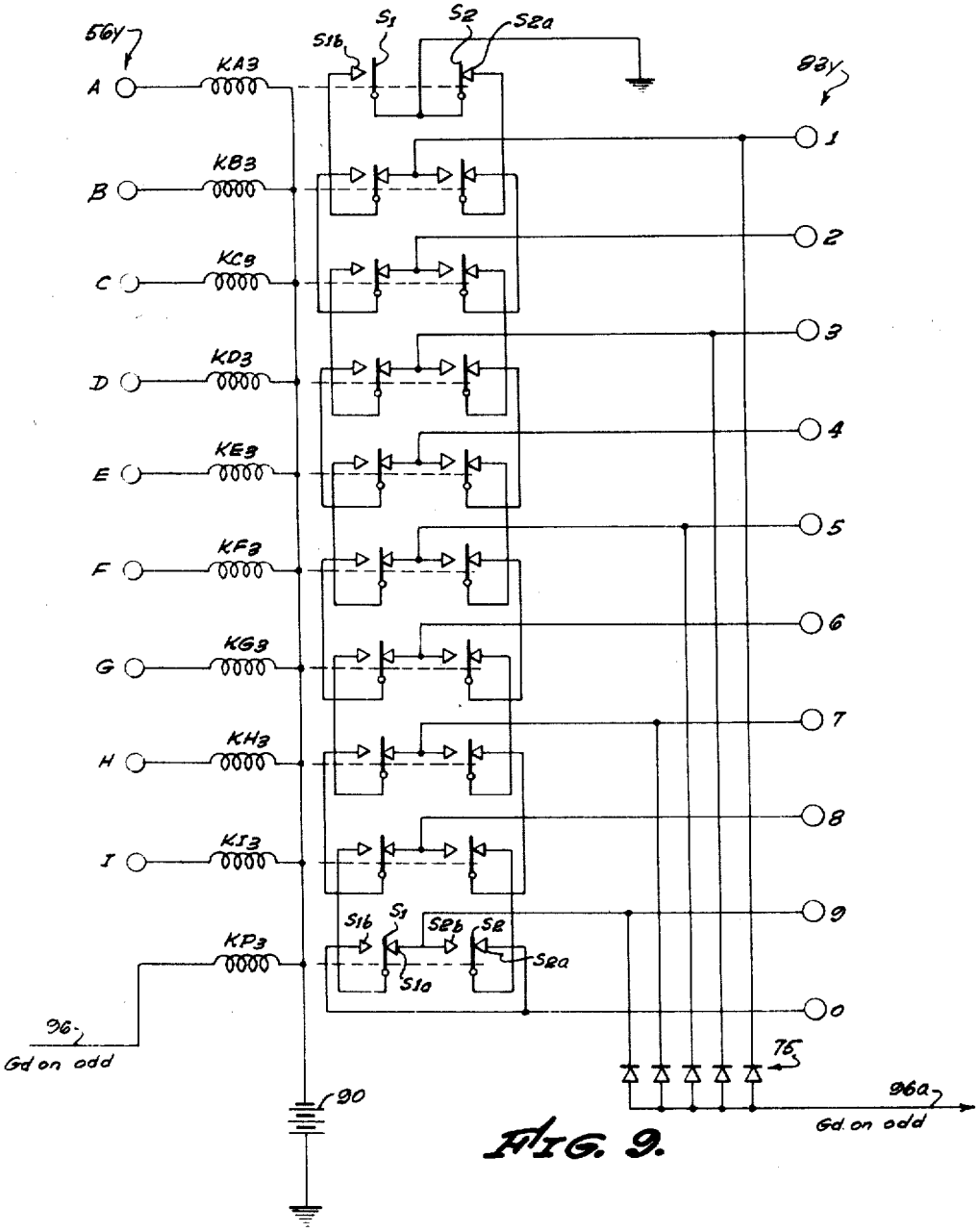
FIG. 9 is a schematic diagram representing a further modification.

Since sub-system X corresponds to the decimal digit of highest significance in the system, it is required to represent only one sequence of digit values 0 through 9. Hence in that sub-system there is a complete one-to-one correspondence between the ten possible configurations of the nine code elements and the ten digit values. In Code II, for example, the Arabic figure 0 is represented by all code elements in state o, with contacts 56X all open, and the Arabic figure 9 is represented by all code elements in state x, with contacts 56X all closed. Typical circuitry for translator 60X will be described.

In sub-systems Y and Z, on the other hand, provision must be made for handling repeated configurations and distinguishing between the two Arabic figures (9 and 0) that they may represent. As already indicated, that is done by referring to the sub-system of next higher significance. For example, the output from translator 60X of sub-system X is tapped from lines 61X and supplied via lines 63X to a parity discriminating circuit, indicated schematically at 64X, which determines whether the parity of the 100's decimal digit is even or odd. In accordance with that determination a signal is transmitted via line 65X to translator 60Y of sub-system Y, and acts to shift that translating circuit between two conditions. The latter will be referred to as the even and odd conditions, it being understood that the terms even and odd refer not ot the decimal digit being handled by that translator, but to the decimal digit of next higher significance. Similarly, the output of translator 60Y is supplied via lines 63Y to another discriminating circuit 64Y, which controls the condition of translator 60Z in the unit's subsystem in accordance with the parity of the 10's digit.

Each translator is thereby placed in condition to interpret correctly the syncopic binary code signal supplied to it, and to produce a corresponding Arabic decimal code signal to its output connections 62.

Figure 5:
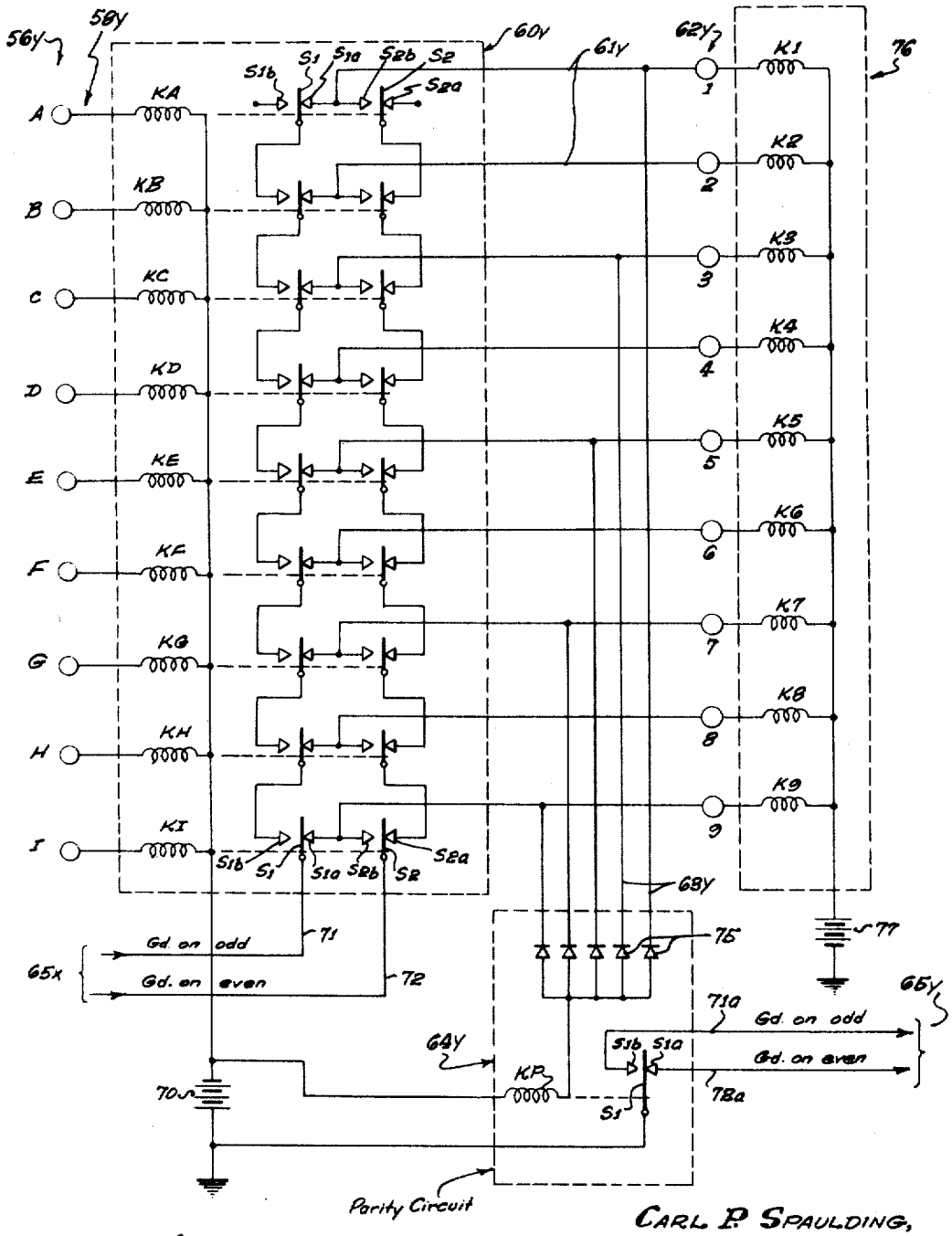
FIG. 5 is a schematic circuit diagram representing illustrative circuitry for the system of FIG. 4.

FIG. 5 is a schematic diagram of an illustrative embodiment of the circuit structure shown in block form in FIG. 4. Circuitry for the single typical sub-system Y is shown explicitly. Switching devices in FIG. 5 are represented for clarity of illustration as electro-mechanical relays, it being well-known that corresponding switching functions can be performed in other ways, for example by electronic devices such as vacuum tubes. The commutator contacts A through I of the respective code elements of the sub-system are connected via respective relay coils KA through KI to a common source of voltage, shown as the battery 70. Each relay has two switch armatures, designated S1 and S2, respectively, which engage switch contacts that are designated by the armature number followed by the letter a if the contact is normally closed and followed by the letter b if the contact is normally open. All relays are shown in normal, unactuated condition. Armatures S1 and S2 of each relay except KI are connected, respectively, to contacts S1b and S2a of the next following relay of the series. The corresponding connections for relay KI are made via lines 71 and 72, respectively, under control of the parity discriminating circuit of the sub-system of next higher significance. That control, typically exercised by parity discriminating circuitry to be described, is such that when the digit of next higher significance is odd, line 71 from armature S1 of relay KI is grounded and line 72 from armature S3 is open; and when the digit of next higher significance is even, line 71 is open and the line 72 is grounded. Contacts S1a and S2b of the several relays KA through KI are connected directly to the decimal output connections 62 corresponding to the decimal digits 1 through 9, respectively.

In operation of the described translating circuitry, when the preceding decimal digit is even, so that line 72 is grounded and line 71 is open, the ground is passed from line 72 up the line of relays via closed contacts S2a from KI toward KA until the first energized relay is reached. at that relay the ground connection is terminated by open contacts S2a, but is passed to armature S2 via closed contact S2b. Ground is thereby applied to the corresponding decimal output connection 62, but to no other such connections. If all relays are energized, ground is applied to decimal output connection 9; while if no relays are energized, no ground is applied to any decimal output connection, which is the regular indication of the digit value 0.

When the preceding digit is odd, so that line 72 is open and line 71 is grounded, that ground is passed up the line of energized relays from KI toward KA via closed contacts S1b only as far as the first unenergized relay. Only at that point is the ground transmitted via closed contact S1a to the corresponding decimal output connection 62. If all relays are energized, the ground is passed all the way along the line of relays to KA, but never reaches an output connection, since all contacts S1a are open. Therefore no decimal output connection is grounded, and the output represents the digit value 0. If all relays are unactuated, only output connection 9 is grounded via closed S1a of relay KI. Reference to Table 2 will show that the translation of the various possible code element configurations is correct.

Translator 60Y of FIG. 5 may be considered to comprise two distinct translating units, one of which handles only the set of code element configurations for even preceding partity and the other only the set of configurations for odd preceding parity, those two translating units being selectively made effective by grounding of the appropriate one of lines 71 and 72. From that viewpoint, the translating unit for even parity includes the switch armature S2 and its contacts S2a and S2b of each relay, while the unit for odd parity includes the switch armature S1 and contacts S1a and S1b of each relay. Separate relay coils, connected in series or in parallel, may be provided in each such translating unit to replace each of relays KA through KI. FIG. 6 illustrates in block form the present aspect of the invention, whereby respective translating means are provided for the even parity configurations and for the odd parity configurations, and are selectively disabled or rendered effective in accordance with parity information supplied over lines 65 and derived from the sub-system of next higher significance.

An illustrative parity discriminating circuit 64Y is shown in FIG. 5. A relay coil KP has one terminal connected to voltage source 70 and the other terminal connected in parallel to all of the decimal output connections 62 that correspond to values of the decimal digit having a particular parity, which is taken illustratively as odd parity. To avoid interaction between these output circuits, valve devices indicated schematically at 75 are introduced into each of the relay connections. Those devices may, for example, be vacuum tube diodes, germanium diodes, or any other type of device that permits flow of current only in the direction required for energization of relay KP by voltage source 70 when one of the odd decimal output connection is grounded via the translator circuits 60. Relay KP controls a single armature S1, which is grounded. Armature S1 normally engages contact S1a and shifts to contact S1b when the relay is energized. Contacts S1a and S1b are connected to lines 72a and 71a, respectively, of the sub-system of next lower significance. Lines 71 and 72 of translator 60Y are similarly connected in the parity discriminating circuit of the sub-system of next higher significance. Such connections are represented in FIG. 4 at 65X and 65Y. It will be understood that in the sub-system of lowest significance no parity circuit is required; and that in the sub-system of highest significance line 72 is permanently grounded and line 71, if present, is permanently open. If desired, relays KA through KI of that latter sub-system may be of simplified type, omitting armature S1 and its contacts S1a and S1b, leading to a translator circuit of the type shown at 80Y of FIG. 9, to be described. A single voltage source 70 may operate the circuits of all the sub-systems.

Considering the system as a whole, it will be seen that movement of control shaft 53 from the position corresponding to the Arabic numeral 499 to 500, for example, causes only one code element to change condition, namely element E of the 100's digit sub-system X. That change shifts relay KE of the X sub-system from idle to actuated condition, changing the output from 100's translator 60X from grounding of terminal 4 to grounding of terminal 5. Grounding of output terminal 5 draws current through relay KP of parity discriminating circuit 64X, actuating that relay and thereby shifting ground from line 72 to line 71 of connection 65X to translator 60Y (FIG. 3). Since all relays KA through KI of that translator are (and remain) actuated, that change in partiy control lifts ground from output connection 9 leaving all output connections open and shifting the output of the 10's translator from 9 to 0 in accordance with the altered preceding parity. That change in output from translator 60Y cuts off relay KP of parity circuit 64Y, causing the output from translator 60Z of the sub-system of least significance to shift from 9 to 0. The change in output of the entire system thus entails changes in output of all three sub-systems, which take place consecutively (and as rapidly as instrumentation permits) in response to the inversion of a single input signal in one sub-system. Similar detailed discussion will be seen to apply also to the illustrative systems to be described below.

A sharp distinction exists between that type of accommodation of the entire translation mechanism to inversion of the state of a single code element, requiring a finite time but going positively and inherently to completion in one direction or the other; and the indeterminate shift of output that may result in previous systems not employing a syncopic code. The settling time of the system, even when including a relatively large number of digits, may in practice be made satisfactorily short by using fast mechanical relays or by employing equivalent switching circuitry employing electronic devices such as vacuum tubes.

The output from a translating system of the present type provides independent indication of the value of each Arabic digit. Thus, the 10's translator shown illustratively in FIG. 5 may directly control a device of any suitable type, indicated schematically at 76Y, for recording the value of the 10's digit. That device may, for example, include nine relays K1, K2 . . . K9, connected between a power source 77 and the respective output connections 62Y of the translator, and may respond to actuation of one of those relays to print the corresponding digit value, and respond to unactuated condition of all nine relays to print the value 0. Similar recording devices may be controlled by the output of each sub-system, so that an Arabic decimal number having any desired number of digits may be printed directly by the entire system.

Figure 7:
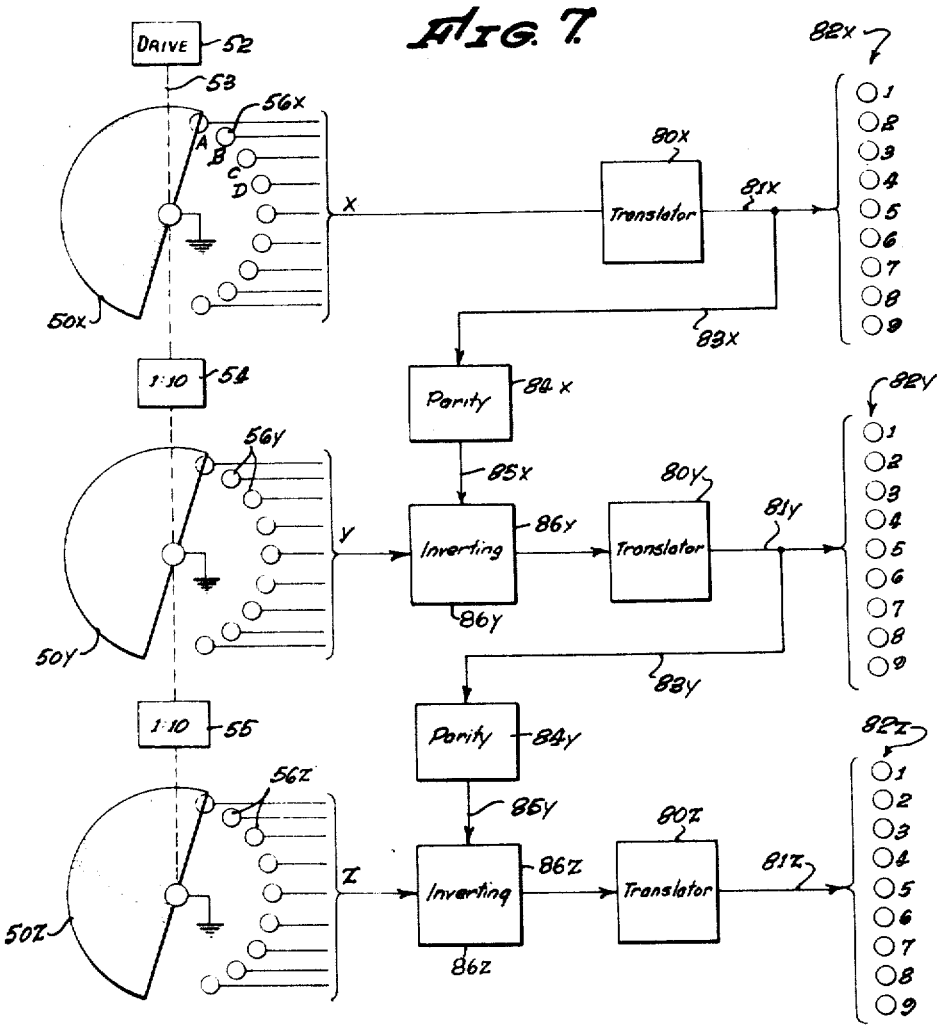
FIG. 7 is a schematic block diagram representing another illustrative type of code translating system.
Figure 8:
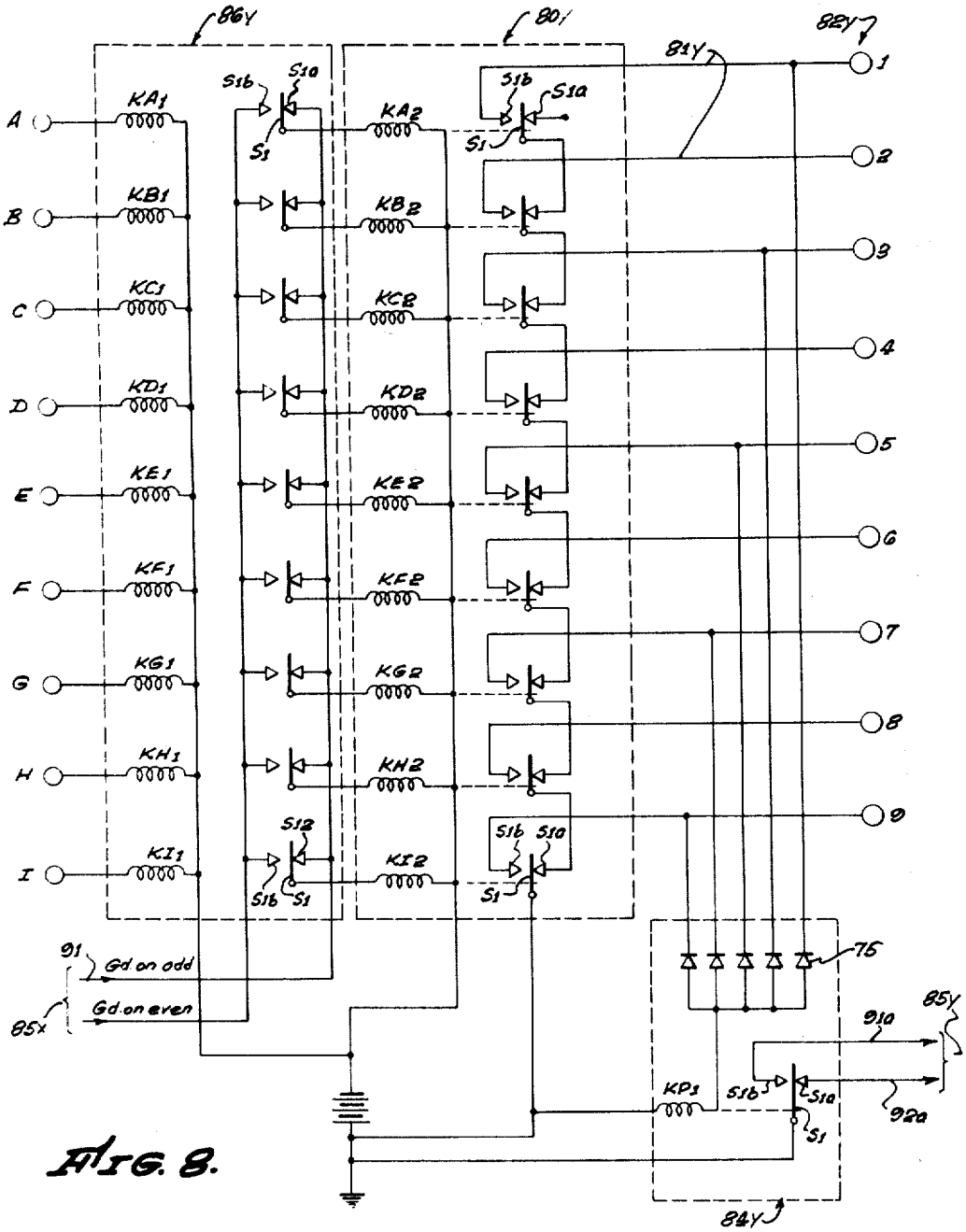
FIG. 8 is a schematic circuit diagram representing illustrative circuitry for FIG. 7.

Another illustrative type of system for translating syncopic binary Code II signals is shown in block form in FIG. 7 and in schematic form in FIG. 8. The syncopic code input via contacts 56X, 56Y and 56Z may be produced in any convenient manner, such as those described with relation to FIG. 1 or 4. The parity discriminators indicated schematically at 84X and 84Y in FIG. 7, which may be closely similar to discriminators 64X and 64Y of FIGS. 4 and 5, receive their information in the same manner from the respective outputs of the translators in the sub-systems to which they belong. Their outputs, however, are supplied to special inverting circuits 86Y and 86Z in the sub-system of next lower significance, where they act to selectively invert the initial syncopic binary code input of that sub-system whenever the preceding parity (the parity of the Arabic digit of next higher significance) is odd. That selectively transformed signal is then supplied as input signal to a translator circuit 80Y or 80Z, and is translated by that circuit directly to the proper Arabic decimal digit output without further reference to the digit of higher significance. That type of system has the advantage that the translators proper may be relatively simple in construction, since they do not require to be shiftable between two conditions in accordance with the parity of the preceding digit. It should be noted, however, that one may consider the inverting circuits 86 of FIGS. 7 and 8 to form a part of the overall translating means, and from that viewpoint the parity discriminating circuits act, as in the system of FIGS. 4 and 5, to shift the translating means from a condition in which its overall action conforms to one type of code to a condition in which its overall action conforms to another type of code.

FIG. 8 shows in schematic form an illustrative inverting circuit 86Y and translating circuit 80Y. Inverting circuit 86Y includes a set of nine relays KA1 through KI1, connected between the respective commutator contacts A through I and a source of voltage 90. Each relay controls a single armature S1, which normally engages a contact S1a and is shiftable upon energization of the relay to engage a normally open contact S1b. All contacts S1a of the relays KA1 through K11 are connected together and to a control lead 91, while all contacts S1b are similarly connected together and to a control lead 92. Those leads in Y sub-system correspond to the connection 85X of FIG. 7, and control the action of inverting circuit 86Y in accordance with the output of the parity circuit 84X of the sub-system of next higher significance. That control is such that lead 91 is grounded and lead 92 open if the Arabic digit value of next higher significance is odd; and that lead 92 is grounded and lead 91 open if that digit value is even. The illustrative circuit for producing such ground control shown at 86Y in FIG. 8 comprises a relay KP1, which is energized from the translator output in the manner already described for relay KP of FIG. 5. The armature of relay KP1 is grounded, and acts via contact S1a to ground line 92a of the sub-system of next lower significance when the decimal digit value is even, and acts via contacts S1b to ground line 91a when that decimal value is odd.

Returning now to the inverting circuit, the relay armature S1 of the relays KA1 through KI1 are connected directly to the respective relay coils of the relays KA2 through KI2 of translator circuit 80Y, and thence to a voltage source, preferably the source 90, already mentioned. The latter relays correspond to the relays KA through KI of FIG. 5. However, in the present system the translator relays require only one armature each, normally engaging a contact S1a and shifting to a contact S1b on relay energization. The contacts S1b of the relays are connected to the nine respective decimal output terminals 82Y via lines 81Y. Contact S1a of each relay is connected to the armature of the preceding relay of the series, the contact S1a of relay KA2 being left open and the armature of relay KI2 being connected to ground.

In operation of the system of FIG. 8, input signals from commutator contacts 56Y are passed along unchanged by inverting circuit 86Y if the preceding decimal digit is even. For, if the preceding digit is even, line 92 is grounded and actuation of any relay of the series KA1 through KI1 then applies ground to the corresponding relay of the series KA2 through KI2; an if the preceding digit is odd, line 91 is grounded and only those relays that are unactuated in the series KA1 through KI1 apply ground to the corresponding relays of the series KA2 through KI2. As a result, for even condition of the preceding digit the actuated relays of the translator correspond to closure of commutator contacts 56Y, while for odd condition of the preceding digit the actuated relays of the translator correspond to open commutator contacts. By thus inverting the input signal to translator 80Y in response to odd condition of the preceding digit, the presence of inverting circuit 86Y simplifies the function of the translator proper, enabling it to function always in accordance with the code correspondence for even preceding parity. The ground connection from the armature S1 of relay KI2 is passed up the line of unactuated relays via their normally closed contacts, and at the first actuated relay is transferred to the decimal output terminal 82Y associated with that relay. If all relays of the series are actuated, only output terminal 9 is grounded; if no relays are actuated, all output terminals remain open, indicating the Arabic figure 0. A translator of the type shown at 80Y may be used also for the sub-system of greatest significance in the system of FIG. 5.

A characteristic of Code II that has already been mentioned is its use of more than ten different code configurations. That characteristic permits use in each sub-system of a translator that operates independently of the preceding parity in translating some or all of the Arabic figures 1, 2 . . . 8; and is controlled by the preceding parity only in translating the rest of those figures (if any) and the figures 0 and 9. FIG. 9 represents an illustrative system in which the preceding parity is relied upon only for distinguishing between the Arabic figures 0 and 9.

The system of FIG. 9 comprises the relays KA3, KB3 . . . KI3 which have their relay coils connected between the respective commutator contacts A through I and a power source 90. Each relay controls two switch armatures S1 and S2. Both armatures of relay KA3 are grounded. Armature S1 of each of the other relays is connected to contact 51b of the preceding relay, and each armature S2 is connected to contact S2a of the preceding relay. Contacts S1a and S2b of each relay except KA3 are connected together and to an output connection 83Y, that connection corresponding to the Arabic figure that is one less than the order of the relay in the series KA3 through KI3. A tenth relay, indicated at KP3, is connected as a tenth member in that series, controlling the output contact 83Y for Arabic figure 9. That tenth relay is controlled by the parity discriminating circuit of the preceding sub-system. For example, the coil of relay KP3 may be connected between a line 96 and power source 90. Line 96 is connected in the sub-system of next higher significance in the manner shown in FIG. 9 for line 96a, the latter line being connected in turn to the relay corresponding to KP3 in the sub-system of next lower significance. As shown, line 96a is connected via individual valve devices 75 to the several output connections 83Y that correspond to the Arabic figures having odd parity.

In operation of the system of FIG. 9, the ground connection shown at the top of the figure is passed down the series of relays KA3 through KI3 either via the series of contacts S2a or via the series of contacts S1b, depending upon whether the preceding parity is odd or even. In either case, at the first relay that is in a condition different from the preceding one the ground is connected via one or other of its contacts S2b and S1a to the appropriate output connection 83Y. The code configurations that represents the Arabic figures 1 through 8 are thus correctly translated and indicated without any shift in the condition of the translator and without any inversion of the input signals, regardless of the preceding parity.

However, the two remaining code configurations, for which all commutator contacts are open and closed, respectively, require reference to the preceding parity for their translation, since each of those configurations sometimes represents the Arabic figure 0, and sometimes the figure 9. In the present illustrative system, when all commutator contacts are open ground is applied to armature S2 of relay KP3; and when all contacts are closed ground is applied to armature S1 of that relay. That ground on armature S2 is transmitted via contact S2b of relay KP3 to output contact 9 only if that relay is actuated, which occurs, as already described, only when the preceding parity is odd. And the described ground on armature S1 is transmitted via contact S1a to output contact 9 only if relay KP3 is unactuated, which occurs for even preceding parity. Otherwise, none of the first nine output contacts 83Y is grounded, which may be utilized as the regular indication of the Arabic figure 0. Alternatively, with a circuit of the present type, a separate output contact for the figure 0 may be provided. Such a contact is shown in FIG. 9, connected to contacts S1b and S2a of relay KP3, and will be seen to be grounded through one or other of those contacts in response to a code configuration representing the Arabic figure 0.

Figure 10:
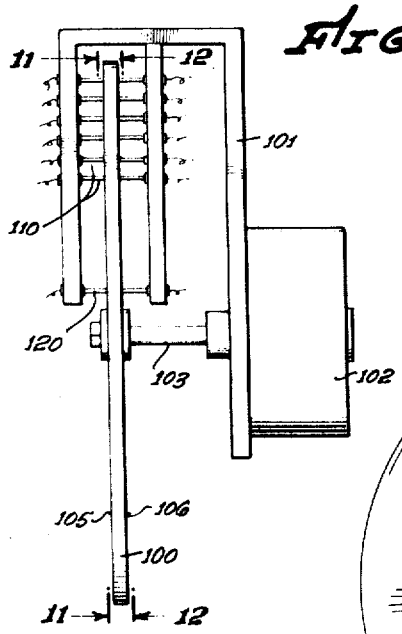
FIG. 10 is a schematic elevation of an illustrative rotary generating means for code of another illustrative type.
Figure 11:
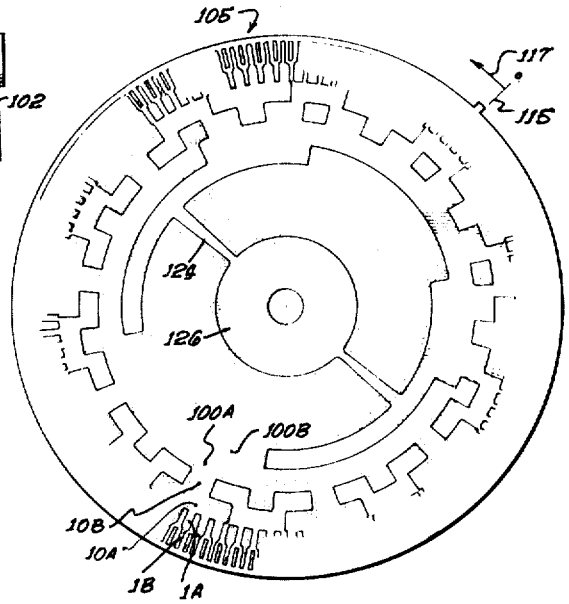
FIG. 11 is a section on line 11—11 of FIG. 10.
Figure 12:
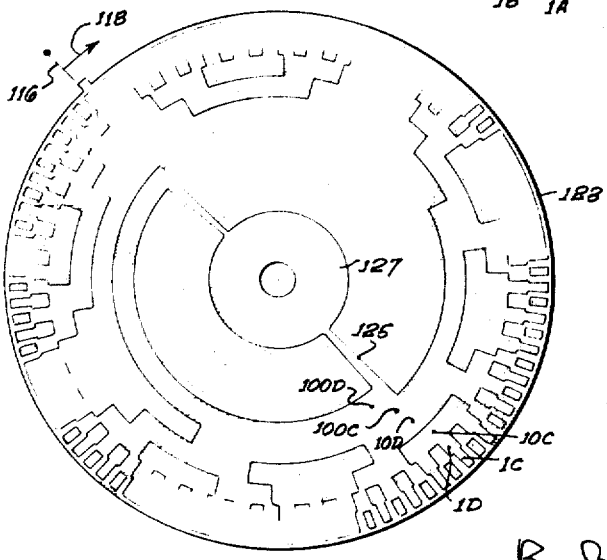
FIG. 12 is a section on line 12—12 of FIG. 10.

Generation of a syncopic code of the type of binary Code I (Table 1) corresponding to either rotary or translational movement may be carried out in a manner analogous to that already described illustratively for binary Code II, the commutator form and brush positions being suitably modified. FIGS. 10–12 illustrate schematically a preferred type of rotary commutator assembly for generating a syncopic binary Code I representation of Arabic members expressible by three decimal digits. Such apparatus may readily be modified to accommodate a larger or smaller number of digits. A circular disk of dielectric material, for example a suitable thermoplastic, is indicated at 100, rigidly mounted on a shaft 103. That shaft is journaled on the frame 101 and is driven by means indicated schematically at 102, which may be considered to drive the shaft in response to some physical quantity to be indicated. Commutator formations corresponding to the twelve code elements required to represent three decimal digits are distributed for convenience on both faces of disk 100 and comprise accurately formed conductive areas 105 and 106, which are preferably embedded in the material of the disk to present a continuously smooth surface. Typical preferred configuration for formations 105 and 106 are shown in FIGS. 11 and 12, respectively.

A plurality of mutually insulated brush contacts 110 are mounted on frame 101 for resilient engagement of the disk faces. As illustrated, each of the conductive formations 105 and 106 comprises six distinct zones, and individual brushes are provided for each of the twelve zones. Each zone and its associated brush correspond to a definite one of the code elements of the binary syncopic code. That correspondence is indicated typically in FIGS. 11 and 12 in terms of the decimal digit (indicated as 1, 10 or 100) and the particular code element within the sub-system corresponding to that digit (indicated as A, B, C or D in accordance with the designation of code elements in Table 1).

As typically shown, all brushes are positioned in radial alignment. In zero position of disk 100, the brushes are at an angular position relative to the disk indicated by the line 115 in FIG. 11 and the line 116 in FIG. 12. The direction of forward disk rotation, corresponding to increasing Arabic numbers, is such that commutator 105 rotates clockwise relative to the fixed brushes as seen in FIG. 11, and commutator 106 rotates counterclockwise as seen in FIG. 12. That forward rotation of the disk causes relative movement of the brushes in the opposite directions over the respective commutator surfaces. The arrows 117 and 118 indicate that relative movement of the brushes over the respective conductive formations 105 and 106.

It will be seen that the commutator formations illustrated in FIGS. 11 and 12 correspond to a binary Code I for which one full rotation of disk 100 is represented by the Arabic number 1000. Each unit of the Arabic number scale corresponds to 0.36 degree of disk rotation. No two working edges of the commutator formations are angularly aligned, which (when all brushes are so aligned) is a necessary condition for generating a syncopic code. The total number of working edges equals the number of Arabic numbers to be represented, which is 1000 in the present instance.

An advantage of the particular commutator arrangement of FIGS. 11 and 12 is that a common electrical connection to all segments of the commutator can be provided particularly simply. As illustrated, conductive borders are provided, as at 122 and 123, on the respective faces of disk 100 in direct contact with all segments of the outer zone on each face; and conductive paths are provided, as at 124 and 125, between at least one segment of the inner zone of the respective faces and the circular conductive areas 126 and 127 at the centers of the faces. Connections to those areas are made by the brushes 120, indicated in FIG. 10. Those brushes may be connected to a source of potential, or may, as in the illustrative circuitry to be described, be directly grounded. In the latter instance, the code generated at the code element brushes 110 may be considered to comprise definite configurations of grounded and open electrical connections, corresponding, respectively, to state x and state o of the several code elements as indicated in Table 1.

Figure 13:
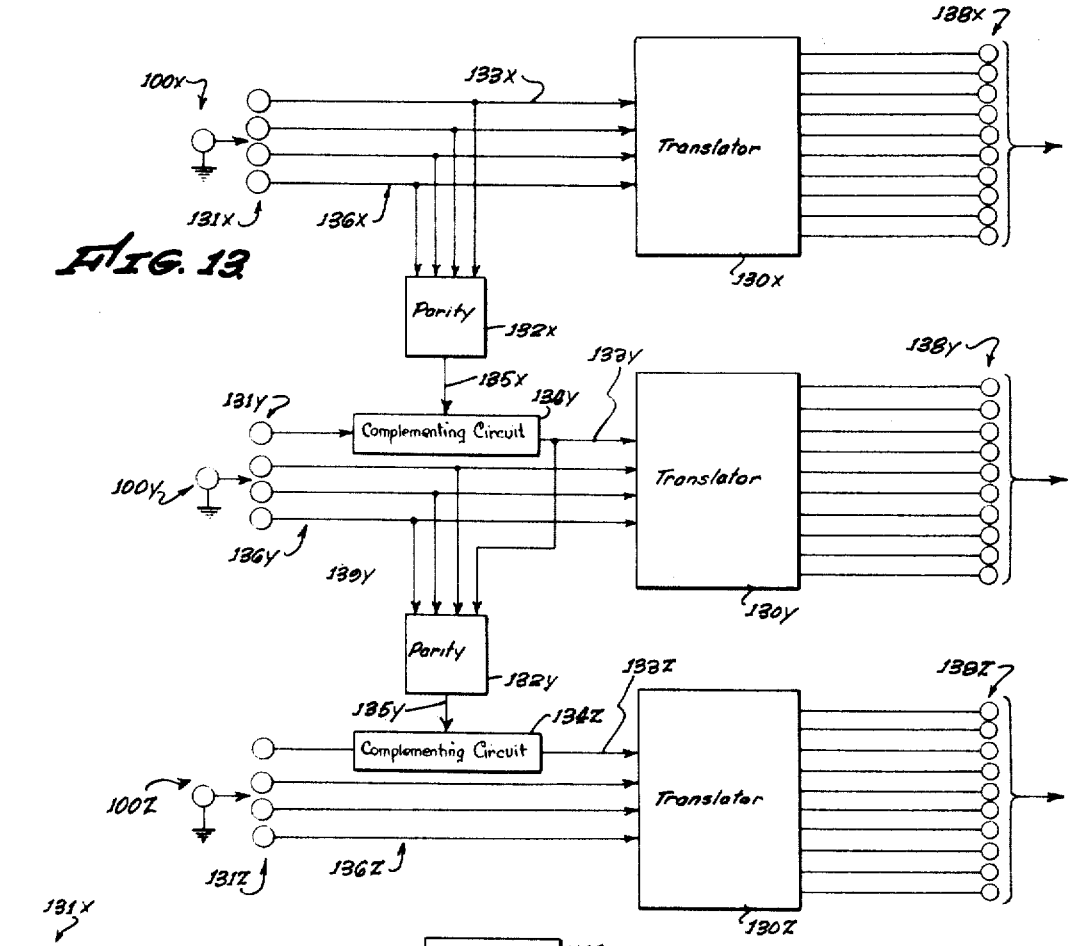
FIG. 13 is a schematic block diagram representing another illustrative code translating system.

The automatic translation of a syncopic code such as binary Code I into a common number code may be carried out by a wide variety of detailed procedures. FIG. 13 represents in block form a preferred type of system for translating binary Code I into common Arabic numbers. Three sub-systems X, Y and Z for handling three Arabic digits are illustratively shown. Each subsystem may be subdivided in accordance with the principal functions of its parts into a translator circuit 130, a parity discriminating circuit 132 (omitted in the subsystem of least significance), and a complementing or inverting circuit 134 (omitted in the sub-system of greatest significance).

Code element connections 131 are indicated in FIG. 13 at A, B, C and D for each of the four code elements of each sub-system. Those connections may be considered to represent the respective brushes 110 of FIG. 10, for example; and the cooperating commutator structure is indicated schematically in FIG. 13 at 100X, 100Y and 100Z. Although those three portions of the commutator structure are mounted on a single shaft in the embodiment of FIGS. 10–12, they might alternatively be modified in relative angular scale and mounted on separate shafts linked by gear boxes in the manner already described in connection with FIG. 4.

The complementing circuits 134 of FIG. 13 correspond in broad function to the inverting circuits 86 of FIG. 7 (for example); but are permitted to be structurally simple by virtue of a characteristic of binary Code I, already described. That characteristic is the fact that a configuration of code element states can always be transformed, by inversion of the state of a single code element, from the configuration that represents a definite Arabic figure for one preceding Arabic parity into the configuration that represents that figure for the other preceding Arabic parity. Therefore the complementing circuit is required, in effect, to invert the state of only that single code element. That fact is indicated in FIG. 13 by showing the complementing circuit of each sub-system connected in the single line 133 from code element contact D to the translator circuit.

More specifically, in the present illustrative instance, each complementing circuit 134 of FIG. 13 receives over line 135 from the sub-system of next greater significance information concerning the Arabic parity of the latter, and acts to invert the signal from code element D when the preceding Arabic parity is odd, but not when it is even. That inversion in effect transforms the initial code element configuration into the 9's complement configuration for delivery to the translating circuit. That 9's complement configuration is precisely what would have been initially produced had the preceding parity been even. The translating circuit is therefore required only to translate all signals supplied to it in accordance with the type of correspondence associated with even preceding parity.

As already indicated, reference to the sub-system of next higher significance for determination of its Arabic parity need not, in general, be made to the output of that sub-system, as was the case in the systems of FIGS. 4 and 7, for example. FIG. 13 illustrates a system in which such reference is made, instead, to the binary code input to the translator circuit of the preceding sub-system. It is noted, however, that such reference is made to the code input after modification by the complementing circuit. Thus, in FIG. 13, parity discriminating circuit 132Y receives input signals on lines 139Y directly from the code element connections 136Y in the case of code elements A, B, and C, since those signals are not affected by the complementing circuit; and receives input signals from code element connection D only via complementing circuit 134Y and line 133Y.

In FIG. 13 the output from each translating circuit is delivered to ten output terminals, indicated generally by the numeral 138, rather than to only nine terminals, as in the systems previously described. The output code, as illustrated, represents the Arabic figure zero by grounding of a definite one of those terminals, in contrast to the previously described output codes in which zero was indicated by open condition of all output terminals.

Figure 14:
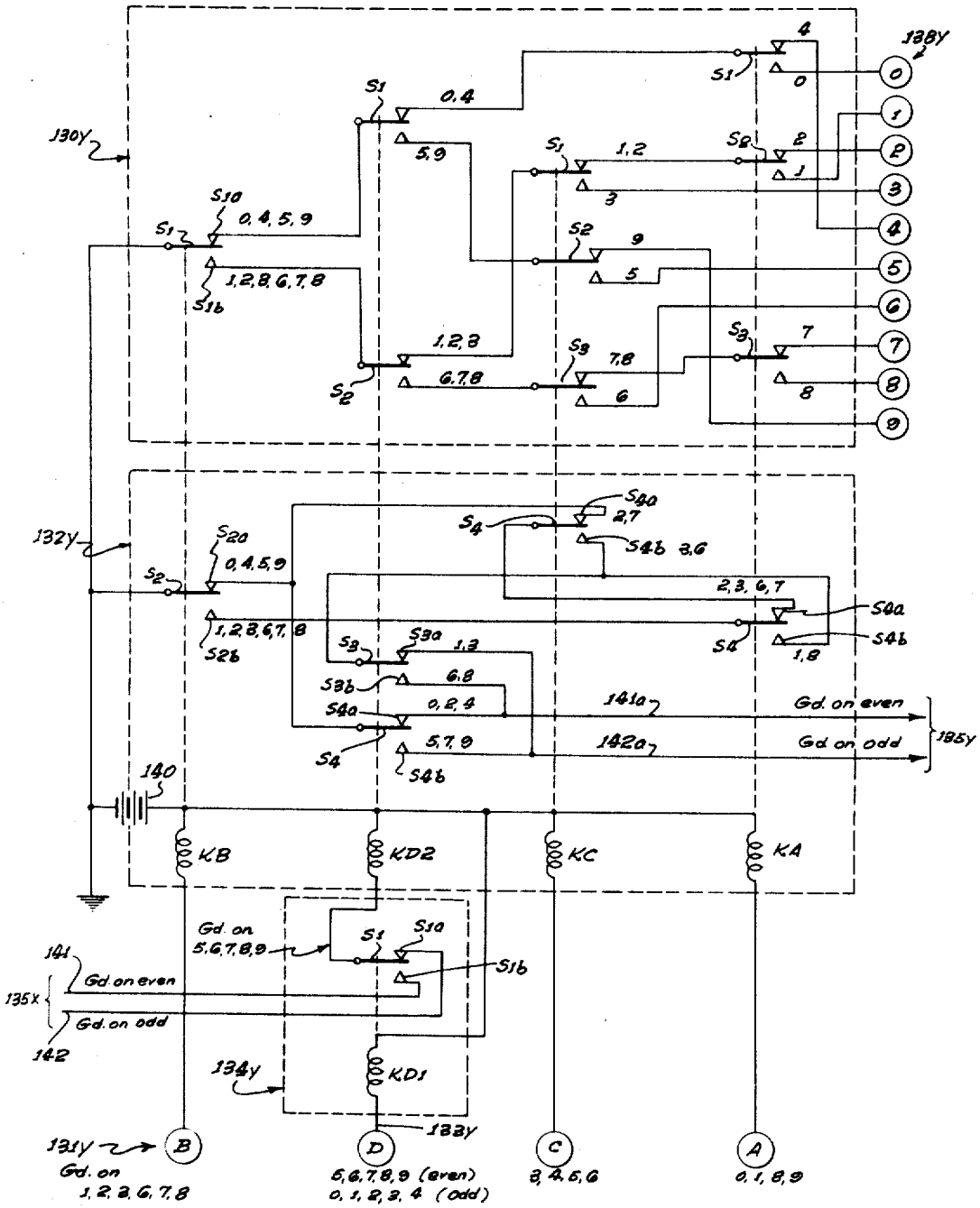
FIG. 14 is a schematic circuit diagram representing illustrative circuitry for FIG. 13.

Illustrative detailed circuitry for the Y sub-system of the system of FIG. 13 is represented in FIG. 14. Four input connections 131Y for the respective code elements A, B, C and D are connected via the respective relay coils KA, KB, KC and KD1 to a source of voltage, shown as the battery 140, so that grounding of one or more of those connections actuates the corresponding relays. Connections 131Y may be considered typically to represent the respective brushes 110 of a code generating system such as that of FIGS. 10–12. The configurations of open and closed contacts for various Arabic numbers (corresponding to definite rotational ranges of the commutator 100 of FIGS. 10–12) are shown, for example in Table 1; and those configurations are indicated for convenience in FIG. 14 by listing adjacent each terminal 131Y the Arabic digit values for which that particular terminal is grounded. The conditions of terminal D are listed for both even and odd preceding parity, the conditions of the other terminals being independent of the preceding parity.

Relay KD1 is a part of complementing circuit 134Y. It controls a single double throw switch armature S1, which is connected via a second relay KD2 to voltage source 140. Normally closed contact S1a of relay KD1 is connected to line 141, and its normally open contact S1b is connected to line 142. Those lines comprise the connection indicated in FIG. 13 as line 135X, and are so connected (as will be explained) in the parity discriminating circuit of the sub-system of next higher significance that when the parity of that sub-system is even line 141 is grounded and line 142 is open, and when that parity is odd the opposite is the case. Complementing circuit 134Y of FIG. 14 therefore actuates relay KD2 under joint control of the state of code element D of its own sub-system (via relay KD1) and of the parity of the preceding sub-system (via lines 141 and 142). When the preceding parity is even, relay KD2 is actuated only when code element D is in state x, with its connection 131Y grounded; and when the preceding parity is odd, relay KD2 is actuated only when code element D is in state o, with its connection 131Y open. The effect is therefore to invert the state of code element D, in respect to its control of relay KD2, whenever the preceding parity is odd. For even preceding parity, each Arabic digit value is represented by a definite code element configuration at connections 131Y, and the respective states of relays KA, KB, KC and KD2 correspond directly to that configuration. For odd preceding parity, each Arabic digit value is represented by a different code element configuration at connections 131Y, but the resulting states of relays KA, KB, KC and KD2 correspond to the configuration by which that digit value would be represented for even preceding parity. The remainder of the sub-system is therefore required to handle only one type of configuration, illustratively taken as that corresponding to even preceding parity.

Relays KA, KB, KC and KD2 control respective groups of switch armatures, S1, S2, etc., some of which are part of translator circuit 130Y and some of which are part of parity discriminating circuit 132Y, as indicated by the dashed boxes in FIG. 14 bearing those designations. The relay windings are included in the box 132Y arbitrarily for convenience of illustration, but may be considered to be a part of both circuits. Alternatively, each relay might be replaced by two separate relays with their windings connected in series or in parallel. The detailed wiring of the relay switches that make up each of the circuits just mentioned may be arranged in a great variety of ways, that illustrated being merely illustrative.

In general outline, the function of the relay switches of translator circuit 130Y is, for each of the ten possible (even parity) code element configurations, to pass a ground connection through one switch only of each of the four relays (or, in certain instances, of three of those relays), so that it is supplied to only that one of the ten output terminals 138Y that corresponds (for even preceding parity) to the existing configuration of states of relays KA, KB, KC and KD2. As illustrated, the first switch of that series is S1 of relay KB. Reference to Table 1 will show that (regardless of preceding parity) code element B is in state o, resulting in unactuated condition of relay KB, for the Arabic figures 0, 4, 5 and 9; and is in state x, resulting in actuated condition of relay KB, for Arabic figures 1, 2, 3, 6, 7 and 8. Switch S1 therefore grounds its normally closed contact S1a only in response to the code element configurations corresponding to the former group of Arabic figures, and grounds it normally open contact S1b only in response to the code element configurations corresponding to the latter group of Arabic figures, as is indicated in FIG. 14 by writing those groups of figures on the respective lines from those contacts. Each of those lines is connected to a switch armature controlled by another code element, which is not in the same state for all of the figures of the indicated group and which is therefore capable of discriminating among them. In the present instance, connection is made from contact S1a of relay KB to switch armature S1 of relay KD2, which (regardless of the preceding parity) is in normal position for figures 0 and 4 and in actuated position for FIGURES 5 and 9; and from contact S1b of relay KB to switch armature S2 of relay KD2, which is in normal position for FIGURES 1, 2 and 3 and in actuated position for FIGURES 6, 7 and 8. The outputs of those switches are similarly supplied, as is clearly shown in FIG. 14, to switches of further relays, each such line being continued until ten output connections are obtained, each of which is grounded only for a distinct one of the ten Arabic figures. Those ten output connections are connected directly to the respective output terminals 138Y, designated in FIG. 14 by the Arabic figures to which they correspond. Any suitable type of device may then be connected to those terminals for utilizing the Arabic decimal code output of the translating system, for example for recording, indicating or computing.

An important advantage of the particular translator circuit arrangement just described is the fact that it requires no more than three switch armatures to be controlled by any one of the code elements of the subsystem. As will become clear, no more than four switch armatures in both the translator circuit and the parity discriminating circuit need to be controlled by any one code element.

The illustrative parity discriminating circuit shown at 132Y in FIG. 14 requires only a total of five double throw switches, two under control of relay KD2 and one under control of each of the relays KA, KB and KC. The switches are so wired that a ground connection from the grounded switch armature S2 of relay KB is passed through a series of switches to the line 141a whenever the code element configuration corresponds to an even Arabic figure, and to the line 142a whenever the code element configuration corresponds to an odd Arabic figure. Those lines 141a and 142a constitute the connection designated 135Y in FIG. 13, and are connected to the complementing circuit of the sub-system of next lower significance in the same manner already described for the lines 141 and 142, respectively, in complementing circuit 134Y of FIG. 14.

More particularly, line 141a is connected to the normally open contacts S3b and to the normally closed contact S4a of relay KD2; and line 142a is connected to the normally closed contact S3a and to the normally open contact S4b of the same relay. The armature S3 of that relay is connected to the normally open contacts S4b of relay KC and relay KA; and the armature S4 of relay KD2 is connected to the normally closed contact S2a of relay KB and S4a of relay KC. Armature S4 of relay KC is connected to normally closed contact S4a of relay KA; and the armature S4 of relay KA is connected to normally open contact S2b of relay KB. The Arabic figures for which ground is supplied to each of the said switch contacts are indicated in FIG. 14, and will be seen to correspond to the states of the several code elements as indicated in Table 1.

Figure 15:
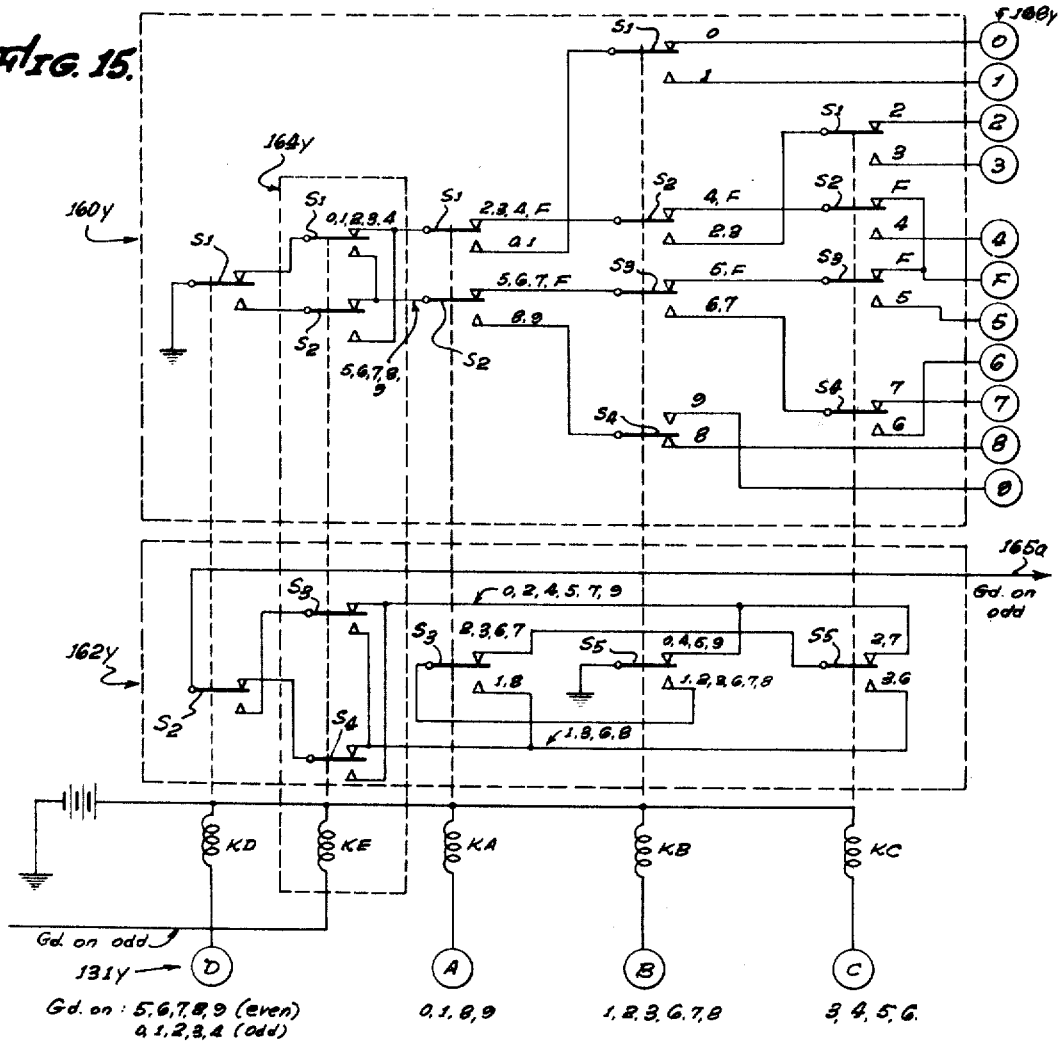
FIG. 15 is a schematic circuit diagram representing modified code translating circuitry.

The modification represented in FIG. 15 differs from the circuitry of FIG. 14 in several respects. Translator circuit 160Y of FIG. 15 illustrates a typical manner in which failure indication may be embodied in the present invention. In addition to switch connections that provide overall functions equivalent to these already described in connection with FIG. 14, further switch armatures and contacts are provided which produce a ground at an eleventh output terminal, designated F in FIG. 15, in response to certain configurations of relay conditions that do not correspond to the code in use and therefore represent failures of the system. In the particular circuit illustrated, the failures that are so indicated are all of a type in which one or more relays fail to operate when they should normally operate in accordance with the code.

FIG. 15 also illustrates a modified type of complementing circuit, indicated at 164Y, which is not entirely distinct from translator circuit 160Y and parity discriminating circuit 162Y, and may be considered to form a part of those circuits. That complementing circuit is controlled from the sub-system of next greater significance via only a single line 165, which is grounded in response to odd preceding parity and is open in response to even preceding parity. The parity discriminating circuit 162Y of the system is adapted to produce that somewhat simpler type of control signal over its output line 165a. For clarity of illustration, the four principal relays of the sub-system are arranged in a different order in FIG. 15 from the arrangement of FIG. 14. That rearrangement tends to make the translator circuits of the two systems appear superficially more similar than they actually are, and the parity discriminating circuits less similar. The Arabic figures for which certain leads and contacts are grounded are indicated in the figure.

Figure 16:
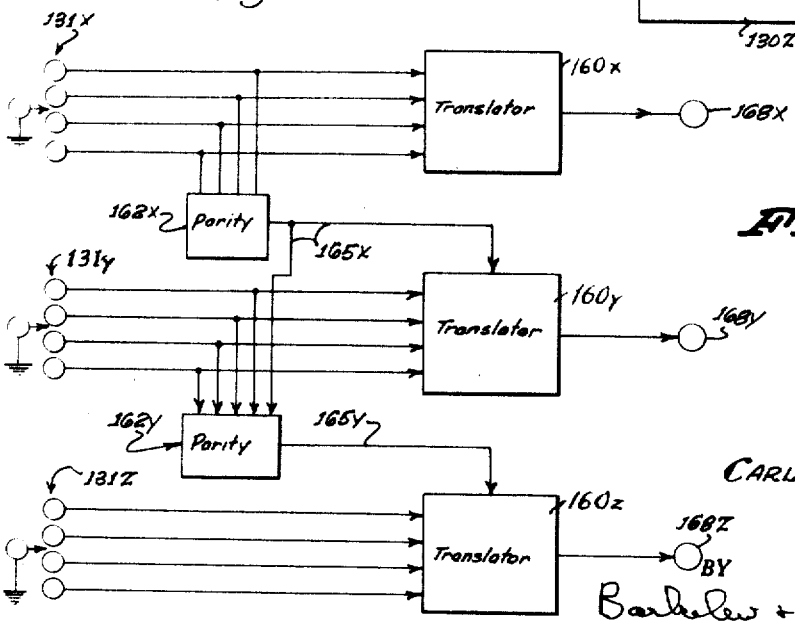
FIG. 16 is a schematic block diagram illustrating an aspect of the circuitry of FIG. 15.

The entire translating system in accordance with FIG. 15 may be represented in simplified block form as shown in FIG. 16. Complementing circuits 164 of FIG. 15 are not shown explicitly in FIG. 16, but are included implicitly as respective parts of translator circuits 160 and parity discriminating circuits 162. The output from parity circuit 162X is supplied via lines represented at 165X to both the translator and the parity circuits of the sub-system of next lower significance. The output from parity circuit 162Y, on the other hand, is supplied only to the translator of the next sub-system, since the latter, being the sub-system of lowest significance, requires no parity circuit. Parity circuit 162Y receives input signals directly from code generator connections 131Y and also from the parity circuit of the sub-system of next higher significance. The parity circuit of the sub-system of highest significance requires signals from its connections 131 only, since its preceding parity is always even.

Referring again to FIG. 15, it will be seen that relay KE performs the complementing functions for both translator 160Y and parity discriminating circuit 162Y. Separate relay coils, connected in series or in parallel, could of course be provided for operating the switch armatures shown in FIG. 15 as S1, S2 of relay KE on the one hand and as S3, S4 of relay KE on the other hand. As to both translator 160Y and parity circuit 162Y, the action of relay KE, as shown, is to shift the circuitry between two condititons, characterized by different patterns of connections between the respective switches of relays KA, KB, KC and KD, one of those conditions conforming to the code for one preceding parity and the other condition conforming to the code of the other preceding parity.

I claim:

1. A system for indicating the Arabic decimal number represented by a set of physical code elements which are shiftable respectively among a plurality of states, said code elements comprising a plurality of groups corresponding to the respective digits of the Arabic number, the configuration of the code element states of each group representing the value of the corresponding Arabic digit in accordance with one syncopic code when the preceding Arabic digit has one parity and representing that digit value in accordance with another syncopic code when the preceding Arabic digit has the other parity the configuration of code element states that represent the digit value 9 in each code being identical with the configuration that represents the digit value 0 in the other code; said system comprising a plurality of translating sections for the respective groups of code elements, input means acting to supply to the respective translating sections sets of input signals representing the configurations of code element states of the corresponding groups, the translating sections including respective translating circuits responsive to the respective sets of input signals and producing respective output signals representing the corresponding Arabic digit values, the translating sections for the Arabic digits of other than least significance including parity discriminating circuits which are responsive to the respective sets of input signals and which act independently of the output signals of the translating circuits to produce respective parity output signals representing the respective parities of the corresponding Arabic digits, the translating circuits and the parity discriminating circuits of the translating sections for the Arabic digits of other than least significance being capable of respective first and second conditions in which they act in accordance with said first and second codes, respectively, and coupling means for each such translating section acting to shift the translating circuit and the parity discriminating circuit of that translating section between their respective conditions in response to the parity output signal of the parity discriminating means of the translating circuit corresponding to the Arabic digit of next greater significance.

2. A system for indicating the Arabic decimal number represented by a set of physical code elements which are shiftable respectively among a plurality of states, said code elements comprising a plurality of groups corresponding to the respective digits of the Arabic number, the configuration of the code element states of each group representing the value of the corresponding Arabic digit in accordance with one syncopic code when the preceding Arabic digit has one parity and representing that digit value in accordance with another syncopic code when the preceding Arabic digit has the other parity, the configuration of code element states that represents the digit value 9 in each code being identical with the configuration that represents the digit value 0 in the other code; said system comprising a translating section for each Arabic digit, input means acting to supply to each translating section a set of signals representing the respective states of the code elements of the corresponding group, at least one of said translating sections comprising translating means responsive to input signals that conform to said one code and acting to indicate the Arabic digit value represented by such signals, and complementing means actuable to transform a set of input signals conforming to said other code into a set of transformed signals conforming to said one code, parity discriminating means responsive to the parity of the preceding Arabic digit, and coupling means for actuating the complementing means under control of said parity discriminating means when the preceding Arabic digit has the said other parity.

3. A system as defined in claim 2 and in which at least one code element of each group is capable of only two states, and the configurations of code element states that represent any Arabic digit value in accordance with the first and second codes, respectively, differ only in the state of said one code element, said complementing means acting to modify said input signals to effectively invert the state of said one code element only.

4. A system as defined in claim 3 and in which, in each said code, said one code element is in one of its states in all configurations of code element states that represent digit values 0 through 4 and is in its other state in all such configurations that represent digit values 5 through 9.

5. A system for indicating the Arabic decimal number represented by a set of physical code elements which are shiftable respectively among a plurality of states, said code elements comprising a plurality of groups corresponding to the respective digits of the Arabic number, the configuration of the code element states of each group representing the value of the corresponding Arabic digit in accordance with one syncopic code when the preceding Arabic digit has one parity and representing that digit value in accordance with another syncopic code when the preceding Arabic digit has the other parity, the configuration of code element states that represents the digit value 9 in each code being identical with the configuration that represents the digit value 0 in the other code; said system comprising a translating section for each Arabic digit, input means acting to supply to each translating section a set of signals representing the respective states of the code elements of the corresponding group, at least one of said translating sections comprising translating means responsive to the input signals and capable of two alternative conditions in which it acts to produce an output signal that represents the Arabic digit value represented by the input signals in accordance with the first and the second codes, respectively, parity discriminating means responsive to the input signals and acting independently of the output signal of the translating means, said parity discriminating means being capable of two alternative conditions in which it develops an output signal that represents the parity of the Arabic digit value represented by the input signals in accordance with the first and the second codes, respectively, and means for shifting both the translating means and the parity discriminating means between their respective conditions in accordance with the parity of the preceding Arabic digit.

6. A system for indicating the Arabic decimal number corresponding to a syncopic representation of said number in which each decimal digit is represented by a group of binary physical code elements; said system comprising a translating section for each Arabic digit, at least one of said translating sections comprising means for developing a parity signal that represents the parity of the corresponding Arabic digit value, the translating section for the Arabic digit of next lower significance comprising a plurality of switching means corresponding to the respective code elements of the group that represents that Arabic digit, means for actuating all but one of said switching means under sole control of the corresponding code element, means for actuating said one switching means under joint control of the corresponding code element and of said parity signal, and output circuit means responsive jointly to said plurality of switching means for indicating the Arabic digit value represented by said group of code elements.

7. A system as defined in claim 6 and in which the second mentioned translating section includes parity circuit means responsive jointly to said plurality of switching means for developing a second parity signal that represents the parity of the last mentioned Arabic digit value.

8. A system as defined in claim 6 and in which each of said switching means comprises a relay having a plurality of switch terminals, said output circuit means comprising output terminals for the respective Arabic digit values and means connecting each of said output terminals in series with respective switch terminals of a plurality of said relays.

9. A system as defined in claim 8 and including also failure indicating means comprising a signal terminal and means connecting the signal terminal in series with respective switch terminals of a plurality of said relays.

10. A system for representing a multi-digit Arabic decimal number by means of a binary coded decimal representation that is syncopic, said system comprising a plurality of physical code elements capable of respective first and second states, said code elements comprising a plurality of groups corresponding to the respective digits of the Arabic number, control means acting in accordance with the value of the Arabic number to shift the several code elements of each group among a plurality of distinct configurations of states, said configurations representing the values of the respective corresponding Arabic digits in accordance with one syncopic code when the preceding Arabic digit is even and in accordance with another syncopic code when the preceding Arabic digit is odd, the configuration of code element states that represents the digit value 9 in each code being identical with the configuration that represents the digit value 0 in the other code, and the configurations of code element states that represent the digit values 1 through 8 inclusive in accordance with both said codes being all mutually distinct.

11. A system for indicating the Arabic decimal number represented by a set of physical code elements which are shiftable respectively among a plurality of states, said code elements comprising a plurality of groups corresponding to the respective digits of the Arabic number, the configuration of the code element states of each group representing the value of the corresponding Arabic digit in accordance with one syncopic code when the preceding Arabic digit has one parity and representing that digit value in accordance with another syncopic code when the preceding Arabic digit has the other parity, the configuration of code element states that represents the digit value 9 in each code being identical with the configuration that represents the digit value 0 in the other code; said system comprising a translating section for each Arabic digit, input means acting to supply to each translating section a set of signals representing the respective states of the code elements of the corresponding group, at least one of said translating stations comprising first translating means responsive to input signals that represent any Arabic digit value from 1 through 8 inclusive in accordance with either of said codes and acting to produce an output signal representing such Arabic digit value, and second translating means capable of two alternative conditions in which it is responsive to input signals that represent Arabic digit values 0 and 9 in accordance with the first and second codes, respectively, and acting to produce an output signal representing such Arabic digit value, and means for shifting said second translating means between its two conditions in accordance with the parity of the preceding Arabic digit.

12. An analog-to-digital converter including an element having a preselected pattern of binary characters recorded in tracks thereon, means for sensing preselected binary characters in each track and providing binary coded electrical signals representative of the sensed binary characters, means for producing relative movement between said element and said sensing means in accordance with the positions of an analog signal to be converted, said preselected pattern of binary characters for each decimal order comprising a plurality of binary characters representative of a decimal digit each arranged in separate tracks on the element to allow all of the binary characters for each decimal order to be simultaneously sensed, the binary characters representative of successive decimal digits in each of the decimal orders are arranged to differ in only one track, the group of binary characters for successive decades of the same decimal order being arranged in modified decimal order whereby the successive combinations of binary characters for the adjacent decades are the same, the combination of binary characters representative of the decimal digits for each decade of a decimal order are further characterized by the ability to represent a binary coded decimal digit and the nine's complement thereof by changing the binary value of one of the binary characters for each unique combination of binary characters when the next higher decimal order is of a preselected parity.

13. An analog-to-digital converter including an element having a preselected pattern of binary characters recorded in tracks thereon, means for sensing preselected binary characters in each track, means for producing relative movement between said element and said sensing means in accordance with an analog signal to be converted, said preselected pattern of binary characters for each decimal order comprising four binary characters representative of a decimal digit arranged in separate tracks on the element to allow all of the binary characters for each decimal order to be simultaneously sensed, the binary characters representative of successive decimal digits in each of the decimal orders are arranged to differ in only one track, the group of binary characters for successive decades of the same decimal order being arranged in modified decimal order whereby the successive combinations of binary characters for the adjacent decades are the same, the combination of binary characters representative of the decimal digits for each decade of a decimal order are further characterized by the ability to represent a binary coded decimal digit and the nine's complement thereof by inverting the binary value of the same one of the binary characters for each unique combination of binary characters, and translating means including means for determining the parity of each higher decimal order for inverting the binary value of the one binary character for each of the lower decimal orders responsive to said sensing means to provide an output indication of the correct sensed decimal digits.

14. An analog-to-digital converter including an element having a preselected pattern of binary characters recorded in terms of conductive and non-conductive segments in tracks thereon, sensing means arranged in continuous electrical engagement with said element for sensing the binary characters in each track and providing electrical indications corresponding to the sensed binary characters, means for producing relative movement between said element and said sensing means in accordance with the position of a shaft to be digitized, said preselected pattern of binary characters for each decimal order comprising four binary characters representative of a decimal digit arranged in four separate tracks on the element to allow all of the binary characters for each decimal order to be simultaneously sensed, the binary characters representative of successive decimal digits are arranged to differ in only one track, the group of binary characters for successive decades of the same decimal order being arranged in modified decimal order whereby the successive combinations of binary characters for the adjacent decades are the same and the only change in the binary coded decimal value in traversing successive decades occurs in the higher decimal order, the combination of binary characters representative of the decimal digits for each decade of a decimal order are further characterized by the ability to represent a binary coded decimal digit and the nine's complement thereof by changing the binary value of one of the binary characters for each unique combination of binary characters, means for determining the parity of each decimal order except the lowest decimal order, and translating means responsive to said last-mentioned means and said sensing means for indicating the correct sensed decimal digit.

15. An analog-to-digital converter including an element having a preselected pattern of binary characters recorded in tracks thereon, means for sensing preselected binary characters in each track, means for producing relative movement between said element and said sensing means in accordance with an analog signal to be converted, said preselected pattern of binary characters for each decimal order comprising four binary characters representative of a decimal digit arranged in four separate tracks to allow all of the binary characters for each decimal order to be simultaneously sensed, the binary characters representative of successive decimal digits in each of the decimal orders are arranged to differ in only one track, the group of binary characters for successive decades of the same decimal order being aranged in modified decimal order whereby the successive combinations of binary characters for the adjacent decades are the same, the combination of binary characters representative of the decimal digits for each decade of a decimal order are further characterized by the ability to represent a binary coded decimal digit and the nine's complement thereof by inverting the binary value of one of the binary characters for each unique combination of binary characters, means for determining whether each of the digits of each of the decimal orders except the lowest decimal order is an odd or even decimal digit, complementing means connected to be responsive to said odd or even determining means and to complement said one binary character for each of the decimal orders except the highest only when the digit for the next higher decimal order is odd, and translating means responsive to said sensing means and said complementing means for indicating the correct decimal digit representative of the analog signal.

16. An analog-to-digital converter including a rotatable shaft for representing an analog signal to be digitized, a cooling element mounted on said shaft to be rotatable therewith, said element having a preselected pattern of binary characters recorded in terms of conductive and non-conductive segments in concentric tracks thereon, electrical brush means arranged in alignment and in continuous electrical contact with said element for sensing the segments in each track and providing a continuous electrical indication of the binary characters presented thereto in accordance with the shaft position, the preselected pattern of binary characters being arranged to indicate the shaft position in terms of a multi-digit decimal number and with each digit of each decimal order of the number being represented by four binary characters and with each binary character recorded in a separate track on the element to allow all of the binary characters for each decimal order to be simultaneously sensed, the pattern being further characterized by the fact that the binary characters representative of successive decimal digits are arranged to differ in only one track and the group of binary characters for successive decades of a decimal order are arranged in modified decimal order whereby the successive combinations of binary characters for the adjacent decades are the same and the only change in the binary coded decimal value in traversing successive decades occurs in one of the higher decimal orders, the combination of binary characters representative of the decimal digits for each decade of a decimal order include the ability to represent a binary coded decimal digit and the nine's complement thereof by changing the binary value of the same binary character for each unique combination of binary characters, means for determining whether the decimal digit for each of the higher decimal orders is odd or even, complementing means responsive to said latter-mentioned means for inverting the binary value of said same binary character for each combination of said characters only when the next higher decimal order is an odd digit, and translating means responsive to the complementing means and the electrical indications provided by said brush means for indicating the correct decimal digit assigned to the corresponding shaft position.

17. An analog-to-digital converter including a rotatable shaft for representing an analog signal to be converted, a coding element mounted on said shaft to be rotatable therewith, said element having a preselected pattern of binary characters recorded in concentric tracks thereon, sensing means arranged in alignment for sensing the binary characters in each track and providing continuous electrical indications of the binary characters presented thereto in accordance with the shaft position, the preselected pattern of binary characters being arranged to indicate the shaft position in terms of a multi-digit decimal number and with each digit of each decimal order of the number being represented by a plurality of binary characters representative of a decimal digit and with each binary character recorded in a separate track on the element to allow all of the binary characters for each decimal order to be simultaneiusly sensed, said pattern including the arrangement of the binary characters representative of successive decimal digits to differ in only one track and the group of binary characters for successive decades of a decimal order being arranged in modified decimal order whereby the successive combinations of binary characters for the adjacent decades are the same and the only change in the binary coded decimal value in traversing successive decades occurs in the higher decimal orders, the combination of binary characters representative of the decimal digits for each decade of a decimal order are further characterized by the ability to represent a binary coded decimal digit and the nine's complement thereof by changing the binary value of one of the binary characters for each unique combination of binary characters, means for determining whether the decimal digit for each of the highest decimal orders is odd or even and changing the binary value of said one binary character for each combination of said characters based on the odd or even determination, and translating means responsive to the odd-even determining means for said one binary character and the electrical indications provided by said brush means for the other binary characters for indicating the correct sensed decimal digit.

18. A digital encoder comprising a carrier having a plurality of regions marked in accordance with a cyclic permuting binary-decimal code in which the digits 0 to 9 of a cyclic permuting decimal code are represented in a binary code which is cyclic permuting at least for each unit change in the decimal digits 0 to 9 and from 9 directly to 0, and sensing means to provide an output indicative of the position of said carrier relative to said sensing means in the said cyclic permuting binary-decimal code.

19. A digital encoder comprising a carrier having a plurality of regions marked in accordance with a cyclic permuting binary-decimal code in which the digits 0 to 9 of the cyclic permuting decimal code of the preferred type described are represented in a binary code which is cyclic permuting at least for each unit change in the decimal digits 0 to 9 and from 9 directly to 0, and sensing means to provide an output indicative of the position of said carrier relative to said sensing means in the said cyclic permuting binary-decimal code.

20. A digital decoder for converting into normal decimal form a cyclic permuting binary-decimal code wherein a binary word representing a digit in the cyclic permuting decimal code of the preferred type described is the same, except for a complementing binary digit, as the binary word representing the cyclic permuting decimal digit's complement on nine and comprising gating means for examining the binary words representing the cyclic permuting decimal digits and for changing the complementing binary digit of the binary word representing a cyclic permuting decimal digit when, and only when, the normal decimal digit of next greater significance than the cyclic permuting decimal digit is odd, and means connected to the output of said gating means for decoding the resulting binary word into its normal decimal equivalent.

21. An analog-to-digital converter including an element having a preselected pattern of binary characters recorded in tracks thereon, means for sensing preselected binary characters in each track, means for producing relative movement between said element and said sensing means in accordance with an analog signal to be converted, said preselected pattern of binary characters for each decimal order comprising four binary characters representative of a decimal digit arranged in four separate tracks to allow all of the binary characters for each decimal order to be simultaneously sensed, the binary characters are identified as the characters ABCD and are arranged in the following successive order to represent the decimal digits zero through nine:

| A | B | C | D |
|---|---|---|---|
| x | o | o | o |
| x | x | o | o |
| o | x | o | o |
| o | x | x | o |
| o | o | x | o |
| o | o | x | x |
| o | x | x | x |
| o | x | o | x |
| x | x | o | x |
| x | o | o | x |

wherein the symbol x represents a binary character of one kind and the symbol o represents a binary character of the other kind, said group of binary characters for successive decades of the same decimal order are alternately arranged in inverse decimal order from the above order, said combination of binary characters representative of the decimal digits for each decade of a decimal order are further characterized by the ability to represent a binary coded decimal digit and the 9's complement thereof by inverting the binary value of the "D" binary character for each unique combination of binary characters, means for determining whether each of the digits of each of the decimal orders except the lowest decimal order is an odd or even decimal digit, and translating means responsive to said last-mentioned means for inverting the binary value of the "D" binary character only when said last-mentioned means indicates that the next higher decimal order is odd and responsive to said sensing means for indicating the correct decimal digit.

22. An analog-to-digital converter including an element having a preselected pattern of binary characters recorded in tracks thereon, means for sensing preselected binary characters in each track in accordance with an analog signal to be converted to produce an output indicative of the position of said element relative to the sensing means, said preselected pattern of binary characters including a unique group of four binary characters representative of each decimal digit arranged to include the following groups of binary characters in a preselected order:

| | | | |
|---|---|---|---|
| x | o | o | o |
| x | x | o | o |
| o | x | o | o |
| o | x | x | o |
| o | o | x | o |
| o | o | x | x |
| o | x | x | x |
| o | x | o | x |
| x | x | o | x |
| x | o | o | x |

wherein the symbol x represents a binary character of one kind and the symbol o represents a binary character of the other kind.

23. An analog-to-digital converter including an element having a preselected pattern of binary characters recorded in tracks thereon, means for sensing preselected binary characters in each track in accordance with an analog signal to be converted to produce an output indicative of the position of said element relative to the sensing means, said preselected pattern of binary characters including a unique group of four binary characters representative of each decimal digit arranged in four separate tracks arranged to include the following groups of binary characters in a preselected order to represent decimal digits:

| | | | |
|---|---|---|---|
| x | o | o | o |
| x | x | o | o |
| o | x | o | o |
| o | x | x | o |
| o | o | x | o |
| o | o | x | x |
| o | x | x | x |
| o | x | o | x |
| x | x | o | x |
| x | o | o | x |

wherein the symbol x represents a binary character of one kind and the symbol o represents a binary character of the other kind, said combination of four binary characters are further characterized by the ability to represent the correct binary coded decimal digit by inverting the binary value of a preselected binary character when the higher order digits are odd.

24. An analog-to-digital converter including an element having a preselected pattern of binary characters recorded in tracks thereon, means for sensing preselected binary characters in each track in accordance with an analog signal to be converted to produce an output indicative of the positions of said element relative to the sensing means, said preselected pattern of binary characters including a unique group of four binary characters, ABCD, representative of each decimal digit arranged in four separate tracks to include the following groups of binary characters in a preselected order to represent decimal digits:

| A | B | C | D |
|---|---|---|---|
| x | o | o | o |
| x | x | o | o |
| o | x | o | o |
| o | x | x | o |
| o | o | x | o |
| o | o | x | x |
| o | x | x | x |
| o | x | o | x |
| x | x | o | x |
| x | o | o | x |

wherein the symbol x represents a binary character of one kind and the symbol o represents a binary character of the other kind, said combination of four binary characters are further characterized by the ability to represent the correct binary coded decimal digit by inverting the binary value of the "D" binary character when the higher order digits are odd, and decoding means including means for determining whether the next higher orders are odd or even for inverting the binary value of the "D" binary character when the higher order digits are odd for decoding the binary characters into the normal decimal digits.

25. A digital encoder comprising a code element affording various combinations of at least four binary characters to represent decimal digits having a plurality of decimal orders, each decimal digit being represented by a unique combination of at least four binary characters wherein the binary characters representative of successive decimal digits differ in only one binary character, the group of binary characters for successive decades of the same decimal order being arranged in a modified decimal order whereby the successive combinations of binary characters representing successive decimal digits of adjacent decades are the same, the combination of binary characters representative of the decimal digits for each decade of a decimal order are further characterized by the ability to represent a binary coded decimal digit and the nine's complement thereof by inverting the binary value of the same binary character for each unique combination of binary characters when the next higher decimal order is of a preselected parity, and sensing means to provide an output indicative of the position of said code element relative to said sensing means in terms of the binary characters defining a discrete position.

26. A digital encoder comprising a carrier having a plurality of regions marked in accordance with a cyclic permuting binary-decimal code in which the digits 0 to 9 of the cyclic permuting decimal code are represented in a binary code which is cyclic permuting at least for the decimal digits 0 to 9, a binary word representing a decimal digit in the binary code differing from a binary word representing that decimal digit's complement on nine by a change of the binary digits and an odd cyclic permuting-decimal digit being represented by an odd number of binary digits 1, and sensing means providing an output indicative of the position of said carrier relative to said sensing means in the said cyclic permuting binary-decimal code.

27. A digital decoder for converting into normal decimal form a cyclic permuting binary-decimal code wherein a binary word representing a digit in the cyclic permuting decimal code is the same, except for complementing binary digits, as the binary word representing the cyclic permuting decimal digit's complement on nine and comprising gating means for examining the binary words representing the cyclic permuting decimal digits and for complementing the binary digits of the binary word representing a cyclic permuting decimal digit when, and only when, the normal decimal digit of next greater significance than the cyclic permuting decimal digit is odd, and means connected to the output of said gating means for decoding the resulting binary word into its normal decimal equivalent.

*28. A digital encoder including an encoding element having a plurality of regions marked with a pattern of unit distance, cyclic permuting binary-decimal characters recorded thereon in a plurality of tracks in a preselected relationship,*

*means for sensing preselected portions of the binary-decimal pattern of each track on the encoding element to produce electrical output signals therefrom,*

*means for producing relative movement between the encoding element and the sensing means to produce electrical outputs indicative of the position of the element relative to the sensing means, the electrical output signals from the encoder being generated by the sensed relationship of the preselected pattern and the sensing means to provide binary-decimal output signals representative of each digit of a multi-order decimal digit, the output signals being arranged for representing selected decimal digits in correct sequence, ascending or descending so that the decimal digits of the same decimal order and successive decimal orders are defined by electrical signals having the unit distance, cyclic, permuting binary-decimal characteristics in the selected decimal digits 0 to 9 and from 9 directly to 0 including the following groups of binary binary output signals arranged in said decimal sequence to have said characteristics:*

| | | | |
|---|---|---|---|
| X | O | O | O |
| X | X | O | O |
| O | X | O | O |
| O | X | X | O |
| O | O | X | O |
| O | O | X | X |
| O | X | X | X |
| O | X | O | X |
| X | X | O | X |
| X | O | O | X |

*wherein the symbol X represents the relationship of a segment and sensing means on the encoding element for generating a binary electrical output signal of one kind, and the symbol O represents the relationship of a segment and sensing means on the encoding element for generating a binary electrical output signal of the other kind.*

*29. A digital encoder as defined in claim 28 wherein said binary output signals as recited therein represents the decimal digits 0 through 9 and from 9 directly to 0 in the correct, descending decimal sequence.*

*30. A digital encoder as defined in claim 28 wherein said binary output signals as recited therein represent the decimal digit 9 through 0 and from 0 directly to 9 in the correct, descending decimal sequence.*

*31. A digital encoder including a rotatable shaft carrying an encoding element having a plurality of regions marked with a preselected binary pattern recorded in tracks thereon for generating unit distance, cyclic permuting binary-decimal electrical signals from the pattern,*

*means for sensing preselected binary segments in each track in accordance with the movements of the shaft to produce said electrical output signals indicative of the position of the element relative to the sensing means, the electrical output signals from the encoder being defined by the relationship of the preselected pattern and the segments sensed by the sensing means to provide binary output signals representative of successive decimal digits in terms of a multi-order decimal digit and wherein the decimal orders are arranged in a preslected sequence, ascending or descending, for representing the decimal digits of each order in terms of electrical signals having the unit distance, cyclic permuting binary-decimal characteristics in the selected decimal digits 0 to 9 and from 9 directly to 0 wherein said output signals include the following groups of binary output signals arranged in said decimal sequence:*

| | | | |
|---|---|---|---|
| X | O | O | O |
| X | X | O | O |
| O | X | O | O |
| O | X | X | O |
| O | O | X | O |
| O | O | X | X |
| O | X | X | X |
| O | X | O | X |
| X | X | O | X |
| X | O | O | X |

*wherein the symbol X represents the relationship of a segment and sensing means on the encoding element for generating binary electrical output signals of one kind, and the symbol O represents the relationship of a segment and sensing means on the encoding element for generating binary electrical output signals of the other kind.*

*32. A digital encoder as defined in claim 31 wherein the binary pattern recorded on the embodying element is recorded in terms of electrically conductive and electrically non-conductive segments and the encoding element includes means for electrically energizing all of the conductive segments recorded thereon for producing the electrical output indications from the sensing means having the unit distance, cyclic permuting, binary-decimal properties.*

*33. A digital encoder as defined in claim 32 wherein the sensing means comprise electrically conductive means adapted to provide said electrical output signals upon engagement with an electrically energized conductive segment on the encoding element.*

*34. A digital encoder as defined in claim 33 wherein the sensing means comprise brush means arranged in a preselected pattern for continuously sensing the segments on the encoding element.*

*35. A digital encoder as defined in claim 34 wherein the encoding element is a disc having said binary pattern recorded on at least one face thereof and the brush means are radially aligned relative to the encoding disc.*

*36. A digital encoder including an encoding element having a plurality of regions marked with a pattern of binary characters recorded in tracks thereon for generating electrical output signals having a unit distance, cyclic permuting binary-decimal properties therefrom,*

*means for sensing preselected portions of said binary characters of each track on the encoding element to produce electrical output signals therefrom, means for producing relative movement between the encoding element and the sensing means to produce electrical output signals indicative of the position of the element relative to the sensing means, the electrical output signals from the encoder being defined by the relationship of said pattern and the sensing means to provide binary-decimal electrical signals representative of successive decimal digits of multi-order decimal digits arranged in a preselected order for representing the selected decimal digits of each decimal order in the correct decimal sequence, ascending or descending in terms of electrical binary signals having the unit distance, cyclic permuting, binary-decimal characteristics in the selected decimal digits 0 to 9 and from 9 directly to 0 including the following*

*groups of binary output signals for successive decimal orders arranged in the following sequence:*

X O O O
X X O O
O X O O
O X X O
O O X O
O O X X
O X X X
O X O X
X X O X
X O O X
X O O X
X X O X
O X O X
O X X X
O O X X
O O X O
O X X O
O X O O
X X O O
X O O O

*wherein the symbol X represents the sensed relationship of a segment and sensing means on the encoding element for generating a binary electrical output signal of one kind, and the symbol O represents the sensed relationship of a segment and sensing means on the encoding element for generating a binary electrical output signal of the other kind.*

*37. A digital encoder as defined in claim 36 wherein said binary output signals represent the decimal digits of successive decimal orders in the fashion of the units and tens orders, - 0, 1, 2, 3 - - - 9, 19, 18, 17 - - - 12, 11, 10 - when arranged in the aforementioned sequence.*

*38. A digital encoder as defined in claim 36 wherein the encoding element comprises a disc having the pattern recorded thereon and mounted on a shaft to be rotatable therewith, the pattern being recorded on the encoding element in terms of electrically conductive and electrically non-conductive segments and the encoding element includes means for electrically energizing all of the conductive segments recorded thereon for producing the electrical output indications from the sensing means having the unit distance, cyclic permuting binary-decimal properties.*

*39. A digital encoder as defined in claim 38 wherein the sensing means comprise electrically conductive means adapted to provide the electrical output signals upon engagement of an electrically energized conductive segment on the encoding element.*

*40. A digital encoder as defined in claim 36 wherein the sequence of the binary output signals are characterized by the ability to provide a correct desired decimal sequence throughout the decimal orders by changing one of the binary output signals of the inverted sequence of the decimal signals to represent the binary signal of the other kind.*

*41. A digital encoder as defined in claim 36 including means for decoding said binary output signals into the normal decimal equivalents.*

*42. A digital encoder as defined in claim 36 for representing decimal digits wherein the odd decimal orders, the tens, etc. are arranged in inverted decimal sequence and the even decimal orders, the units, etc. are arranged in correct decimal sequence.*

*43. A digital encoder comprising a carrier having a plurality of conductive and non-conductive regions recorded and arranged in tracks thereon in accordance with a cyclic permuting binary-decimal code in which the recorded and arranged in tracks thereon in accordance with are represented in a binary code which is cyclic permuting at least for each unit change in the decimal digits 0 to 9 and from 9 directly to 0, the elements of the binary code being represented by the conductive and non-conductive regions of the carrier,*

*and sensing means engaging the conductive and non-conductive regions of each track of the carrier to provide an electrical output indicative of the position of said carrier relative to said sensing means in the said cyclic permuting binary-decimal code upon the production of relative movement between the carrier and the sensing means.*

References Cited

The following references, cited by the Examiner, are of record in the patented file of this patent or the original patent.

UNITED STATES PATENTS

| | | | |
|---|---|---|---|
| 2,318,591 | 5/1943 | Couffignal | 235—61 |
| 2,405,603 | 8/1946 | Parker et al. | 340—204 |
| 2,502,837 | 4/1950 | Entz et al. | 340—347 |
| 2,571,680 | 10/1951 | Carbrey | 340—347 X |
| 2,620,980 | 12/1952 | Brown | 340—347 |
| 2,660,618 | 11/1953 | Aigrain | 340—347 X |
| 2,679,644 | 5/1954 | Lippel | 340—347 X |
| 2,733,432 | 1/1956 | Breckman | 340—347 X |
| 2,754,520 | 7/1956 | Dickinson | 340—347 |
| 2,784,396 | 3/1957 | Kaiser et al. | 340—347 |

FOREIGN PATENTS 762,284 11/1956 Great Britain.

OTHER REFERENCES

Pages 567–571 November 1953; "A Progressive Code Digital Quantizer," Floyd Raasch, Transactions of the AIEE, vol. 72, part 1.

MAYNARD R. WILBUR, *Primary Examiner.*

W. J. KOPACZ, *Assistant Examiner.*

U.S. Cl. X.R.

235—154

UNITED STATES PATENT OFFICE
CERTIFICATE OF CORRECTION

Reissue No. 26,607 June 17, 1969

Carl P. Spaulding

It is certified that error appears in the above identified patent and that said Letters Patent are hereby corrected as shown below:

Column 2, line 39, "correspondencs" should read -- correspondence --. Column 3, line 32, "bindary" should read -- binary --. Column 4, line 75, "explicity" should read -- explicitly --. Column 7, line 43, "requried" should read -- required --. Column 8, line 52, "entirley" should read -- entirely --. Column 9, line 38, "simply" should read -- simple --. Column 14, line 25, "connection" should read -- connections --; line 42, "FIG. 9" should read -- FIG. 8 --. Column 15, line 64, "K11" should read -- KI1 --. Column 16, line 29, "an" should read -- and --. Column 19, line 42, "systems" should read -- system --. Column 20, line 70, "it" should read -- its --. Column 21, line 47, "contacts" should read -- contact --. Column 24, line 46, "switch" should read -- switching --. Column 31, line 30, after "descending" insert a comma; line 36, cancel "binary", second occurrence; line 57, "represents" should read -- represent --; line 59, "descending" should read -- ascending --; line 62, "digit" should read -- digits --. Column 32, line 32, "embodying" should read -- encoding --; line 56, cancel "a". Column 34, line 13, cancel "and arranged in tracks thereon in accordance with" and insert -- digits 0 to 9 of a cyclic permuting decimal code --.

Signed and sealed this 31st day of March 1970.

(SEAL)
Attest:

EDWARD M.FLETCHER,JR.
Attesting Officer

WILLIAM E. SCHUYLER, JR.
Commissioner of Patents